US008307299B2

(12) United States Patent  (10) Patent No.: US 8,307,299 B2
Conner  (45) Date of Patent: Nov. 6, 2012

(54) VIRTUAL OFFICE MANAGEMENT SYSTEM

(75) Inventor: Brian Conner, Greenville, SC (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 429 days.

(21) Appl. No.: 12/398,031

(22) Filed: Mar. 4, 2009

(65) Prior Publication Data

US 2010/0229113 A1  Sep. 9, 2010

(51) Int. Cl.
*G06F 3/048* (2006.01)
(52) U.S. Cl. ....................................................... 715/778
(58) Field of Classification Search .................. 715/778
See application file for complete search history.

(56) References Cited

U.S. PATENT DOCUMENTS

| | | | | |
|---|---|---|---|---|
| 5,784,546 | A * | 7/1998 | Benman, Jr. ................. | 715/207 |
| 5,808,612 | A | 9/1998 | Merrick et al. | |
| 6,031,989 | A * | 2/2000 | Cordell ........................ | 717/109 |
| 6,104,406 | A | 8/2000 | Berry et al. | |
| 6,608,549 | B2 | 8/2003 | Mynatt et al. | |
| 6,754,900 | B1 * | 6/2004 | Kelley et al. ................. | 719/319 |
| 7,003,737 | B2 | 2/2006 | Chiu et al. | |
| 7,203,737 | B2 | 4/2007 | Starbuck et al. | |
| 7,240,289 | B2 | 7/2007 | Naughton et al. | |
| 7,478,129 | B1 * | 1/2009 | Chemtob ...................... | 709/204 |
| 7,707,249 | B2 * | 4/2010 | Spataro et al. ................ | 709/205 |
| 2002/0091697 | A1 * | 7/2002 | Huang et al. .................... | 707/10 |
| 2003/0179240 | A1 | 9/2003 | Gest | |
| 2003/0218638 | A1 | 11/2003 | Goose et al. | |
| 2004/0100489 | A1 | 5/2004 | Berestov et al. | |
| 2004/0109031 | A1 | 6/2004 | Deaton et al. | |
| 2005/0193347 | A1 * | 9/2005 | Van Dam ..................... | 715/764 |
| 2006/0143041 | A1 | 6/2006 | Tipirneni | |
| 2006/0224710 | A1 | 10/2006 | Price | |
| 2007/0016853 | A1 | 1/2007 | Abagyan et al. | |

(Continued)

OTHER PUBLICATIONS

Takada, H., et al., "An Object-Oriented Office Space Description Model and an Office View Management Mechanism for Distributed Office Environment." Foundations of Data Organization and Algorithms, 4th International Conference, FODO 1993, pp. 362-377. Publisher: Springer-Verlag, Berlin, Germany (ISBN-10: 3 540 57301 1) (Abstract Only).

(Continued)

*Primary Examiner* — William Bashore
*Assistant Examiner* — Hien Duong
(74) *Attorney, Agent, or Firm* — Barley Snyder

(57) ABSTRACT

A virtual office management system has an image output module that displays as a single view web page. A series of defined sections are included in the single view web page, a defined section being a divisible frame capable of displaying separate content within that divisible frame, a physical office module, a desktop module, and a resource module. The physical office module is connected to the single view web page and displayed within the divisible frame, the physical office module providing a layered physical office environment with tags assigned to file directories. The desktop module is connected to the single view web page and displayable through the divisible frame, the desktop module being linkable to content of a pre-determined file directory that is then displayed as a system file folder, and changeable through assigned tags associated with the layered physical office environment. The resource module is connected to the single view web page through a series of separate embedded links, the links individually layered into another frame of the single view web page and connected to both internal and external content.

27 Claims, 25 Drawing Sheets

U.S. PATENT DOCUMENTS

| | | | |
|---|---|---|---|
| 2007/0192727 A1* | 8/2007 | Finley et al. | 715/781 |
| 2008/0072168 A1 | 3/2008 | Conway et al. | |
| 2008/0134055 A1 | 6/2008 | Satchell | |
| 2008/0147790 A1 | 6/2008 | Malaney et al. | |
| 2008/0183483 A1 | 7/2008 | Hart | |
| 2008/0275794 A1* | 11/2008 | Ioimo et al. | 705/27 |
| 2008/0316204 A1* | 12/2008 | Deslandes | 345/419 |
| 2009/0251457 A1* | 10/2009 | Walker et al. | 345/418 |
| 2009/0328063 A1* | 12/2009 | Corvera et al. | 719/315 |

OTHER PUBLICATIONS

Farias, F.A., et al., "Three Dimensional Modeling of a Virtual Medical Office in a Medical Area." WSEAS Transactions on Systems, vol. 2, No. 2, Apr. 2003, pp. 366-399. Publisher: WSEAS, Greece (ISSN: 1109-2777) (Abstract Only).

Sohlenkamp, M., et al., "Integrating Communication, Cooperation, and Awareness: The DIVA Virtual Office Environment. Transcending Boundaries." CSCW 94, Proceeding of the Conference on Computer Supported Cooperative Work, 11194, pp. 331-343. Publisher: ACM, New York, NY, USA (ISBN-10: 0 89791 689 1).

Honda, et al., "A Company-Office System "Valentine" Providing Informal Communication and Personal Space Based on 3D Virtual Space and Avatars." Source: Information and Software Technology, V. 41, N. 6, Apr. 25, 199, pp. 383-397. (Abstract Only).

* cited by examiner

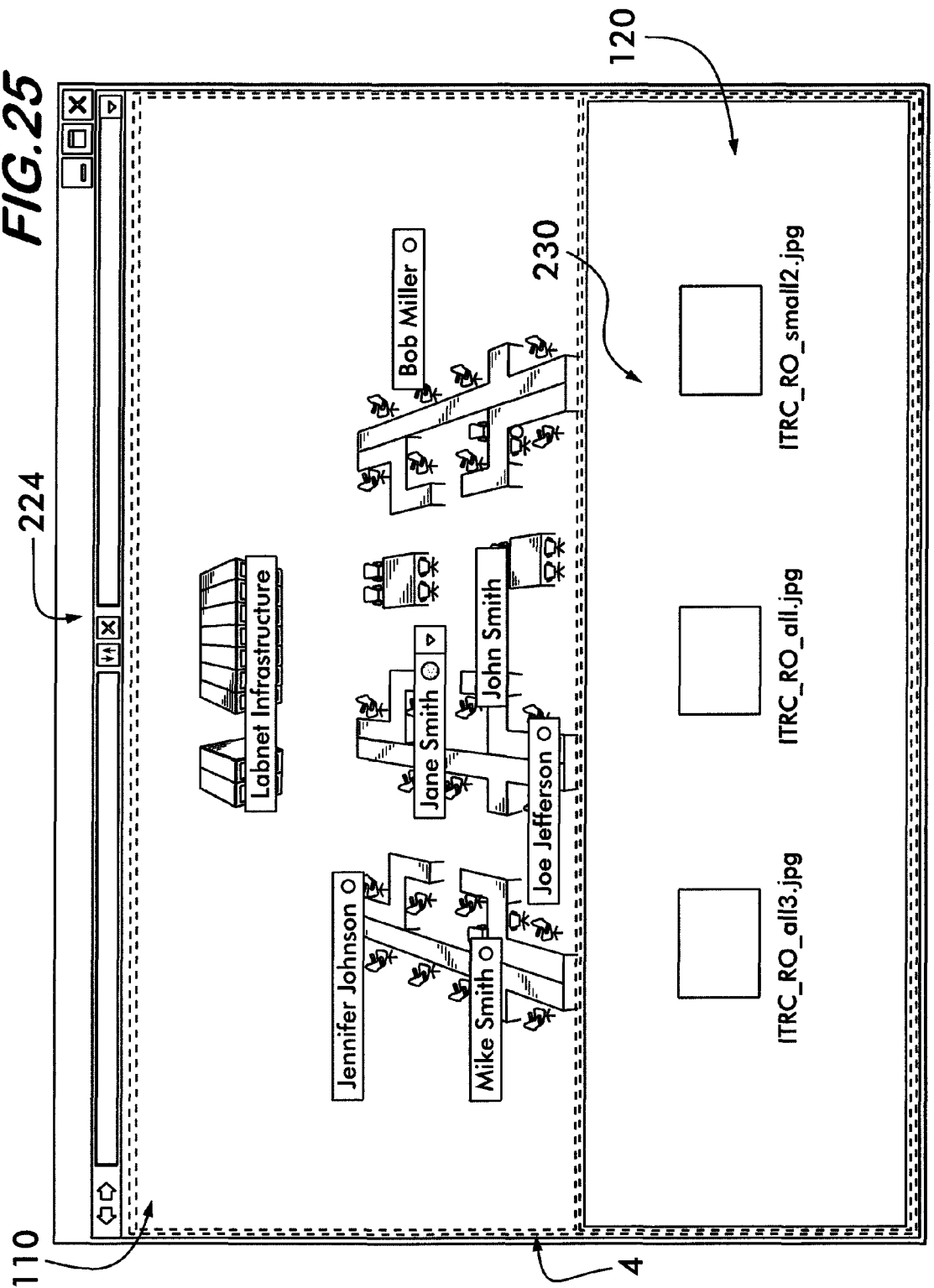

US 8,307,299 B2

VIRTUAL OFFICE MANAGEMENT SYSTEM

FIELD OF THE INVENTION

The invention relates to a virtual office management system and method that allows a user to monitor and manage staff member work through a user-friendly three-dimensional Graphical User Interface (GUI).

BACKGROUND

Increased technology and corporate globalization necessitate better management of information and staff members across many different boundaries. Information is spread across servers and databases, generally accessed through different software systems. Employees are in different time zones and are required to communicate with each on a more consistent basis.

It is a primary challenge of management to facilitate a clear communication of ideas between these staff members, while providing staff members with the resources and information they need to complete assigned tasks.

Traditionally, companies have developed intranet systems that utilize internet protocols and network connectivity to securely share information or operational systems with its staff members. However, typical intranet presences are deployed on a separate web servers in order to have rich functionality. Management of information on these servers is not always readily available and strains system resources.

Combining existing hardware and software into an integral office management system that enables remote access to the tools and/or information has been long desired. Office management systems have been developed that are in the form of a three-dimensional graphical user interface (GUI) for navigating within a virtual office environment. This allows the user, especially a manager, to have an integrated view of the office environment enabling better communication and information management. Employing a three-dimensional GUI provides these solutions with some connection to the physical environment to provide an intuitive grasp of resources, operation, and information available.

U.S. Patent Application Publication No. 2007/0192727 discloses a method for a virtual workspace comprising a three-dimensional user interface in which applications are accessed via user interaction with three-dimensional images. The method comprises a layer that allows a user to interact with 3-D objects to complete normal tasks and access physical assets. One embodiment of the reference provides information to a user in a fashion that is consistent with how a user would normally acquire corresponding information in the physical world. Although U.S. Patent Application Publication No. 2007/0192727 discloses a method for a virtual workspace comprising a three-dimensional user interface in which applications are accessed via user interaction with images of three dimensional shapes, this system presents a problem in that is lacks management of information across servers, supervision and interaction with staff members.

U.S. Patent Application Publication No. 2008/0183483 discloses management software comprising a web-based custom map application that links relational databases to a browser rendering format layout map that shows physical locations and relationships among people, rooms and other assets, and further teaches that the user first develop relational databases through information gathering. However, any information that is linked to the visual assets must be prepared prior to use. This system is purely a database front end or graphical user interface (GUI) that lacks the ability to link to present information found on a network server, which further facilitates supervision and interaction with other staff members.

U.S. Patent Application Publication No. 2004/0109031 discloses a customizable three-dimensional graphical user interface that allows for complete access to an existing computer operating system, applications and files, as well as the internet and on-line web portals. The software application automatically scans a computer user's hard drive and dynamically creates a customized three-dimensional environment that allows intuitive access to all of the user's computer functionality. In a preferred embodiment, the three-dimensional graphical user interface installs as the active desktop on a PC, replacing the user's "wallpaper" with the three-dimensional graphical user interface significantly increasing the viewing area and allows improved productivity and access to information. The three-dimensional desktop can actually look like an office where software applications and operating system functions are represented as realistic three-dimensional icons. A calculator program can be accessed by clicking on the calculator on the desk, a word processing document can look like actual paper documents, the weather outside can be based on today's weather forecast, and the radio accesses an Internet radio station. Although this graphical user interface allows for complete user access to an existing computer operating system, applications and files as well as the internet and on-line web portals, the reference only teaches intuitive access to a single user's computer functionality. The reference presents a problem in that it lacks desirable computer networking and monitoring features.

Many information management solutions, even the ones discussed above, fail to facilitate staff member supervision and network interaction. Presence awareness is one type of tool that can provide better communication with staff members. Information management solutions, unless they are server deployed, do not provide a rational file storage scenario for minimizing email traffic and cost. Companies have long desired a platform that enables staff members to communicate more efficiently in order to limit system resources, yet provide structure that gives managers and workers ready access to all the disparate resources available to them.

Currently, it takes multiple software systems and applications to access people, resources, and documents. Integrating a combination of these features has been challenging. An end-user, such as a manager, needs to control various aspects of the office environment. Providing a single integrated user friendly single view web page that integrates software systems and applications, wherein the end-user may manage and monitor staff members, assets, as well as documents, would be advantageous.

It is furthermore desirable to accomplish this with a minimum of clicks and without navigating away from a single page.

SUMMARY

It is an object of the present invention to provide an intranet solution for project and information management having an user-friendly three-dimensional Graphical User Interface (GUI) for navigating within a virtual office environment, wherein off-the-shelf software components are integrated as a single view web page. The single view web page would provide a realistic layout of an office and access to applicable assets, as well as staff member presence awareness and access to well-formed network storage and document structures.

The invention relates to a virtual office management system, having an image output module that displays as a single view web page, a series of defined sections in the single view web page, one defined section being a divisible frame capable of displaying separate content within that divisible frame, a physical office module, a desktop module, and a resource module. The physical office module connected to the single view web page and displayed within the divisible frame, the physical office module providing a layered physical office environment with tags assigned to file directories. The desktop module connected to the single view web page and displayable through the divisible frame, the desktop module linkable to content of a pre-determined file directory that is then displayed as a system file folder, and changeable through assigned tags associated with the layered physical office environment. The resource module connected to the single view web page through a series of separate embedded links, the links individually layered into another section of the single view web page and connected to both internal and external content.

BRIEF DESCRIPTION OF THE DRAWINGS

The invention will be explained in greater detail with reference to embodiments, referring to the appended drawings, in which:

FIGS. 22-25 are graphical representations of the virtual office management system, concentrating on the source file and file structure.

DETAILED DESCRIPTION OF THE EMBODIMENT(S)

Figure 1:
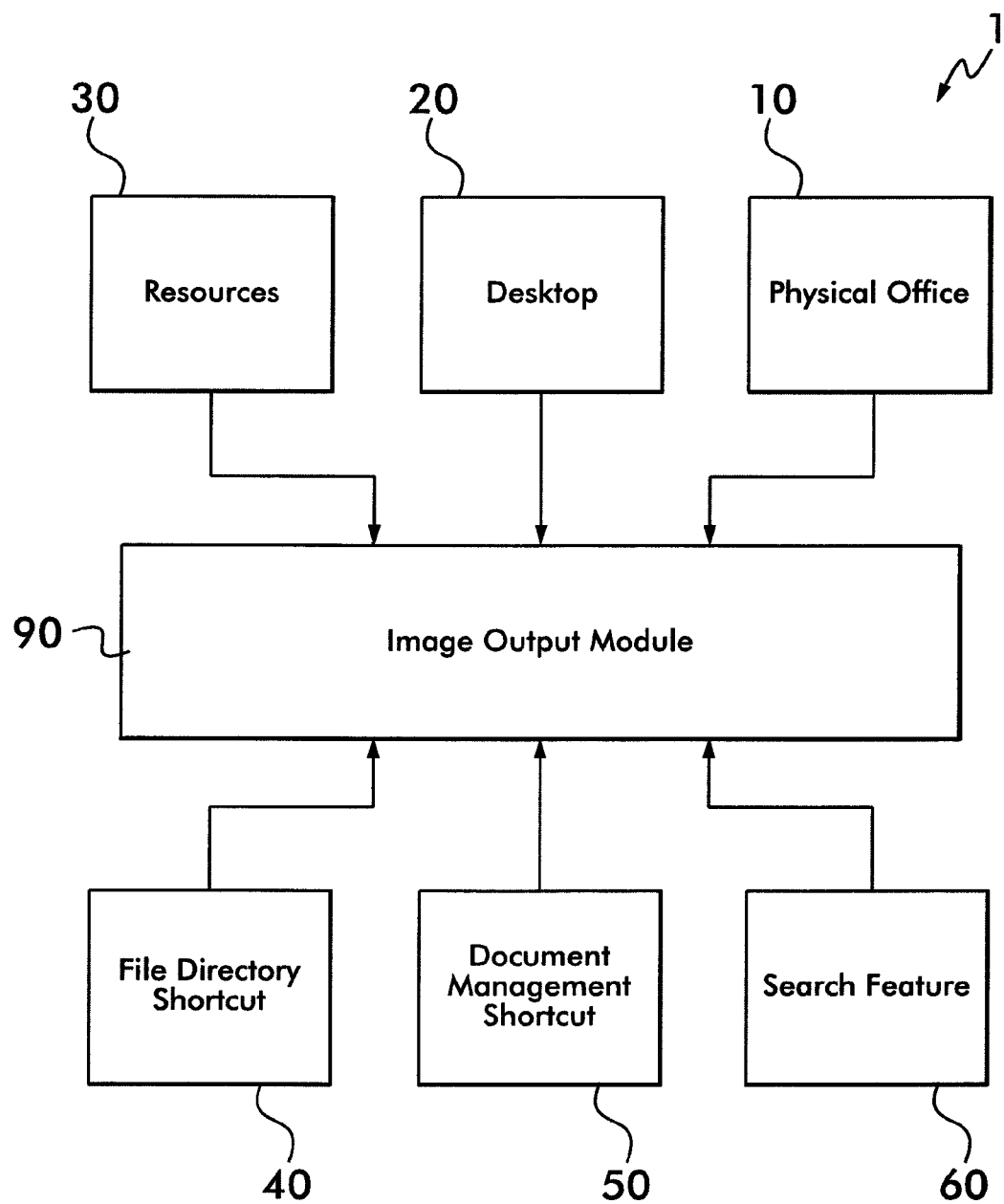
FIG. 1 is a flow diagram of a virtual office management system and user modules according to the invention.

The invention will now be described in greater detail first with reference to FIG. 1.

The virtual office management system 1, according to the embodiment shown, has seven major components. Those major components being a physical office module 10, a desktop module 20, a resources module 30, a file directory module 40, a corporate portal module 50, a search feature module 60, and an image output module 90. The virtual office management system 1 is provided to monitor, access, and manage information and staff member work through various modules, using a user-friendly three-dimensional graphical user interface (GUI).

The virtual office management system 1, as a single view web page, allows the user to navigate within a virtual office environment, access server file folders and information, and interact with off-the-shelf software components through the modules. The image output module 90 displays the virtual office management system 1 through a series of HTML files, integrated with Cascading Style Sheets (CSS) language and JavaScript (JS) files, to write functions that are embedded in or included with the HTML pages and interact with the Document Object Model (DOM) of the page. Discussion of file folder content and function will be described in further detail below.

The physical office module 10, the desktop module 20, the resources module 30, the file directory module 40, the document management module 50, and the search feature module 60, may all be accessed through virtual office system 1, through a series of elements, frames, hyperlinks, tags and content layered within the HTML code of the single view web page.

Figure 2:
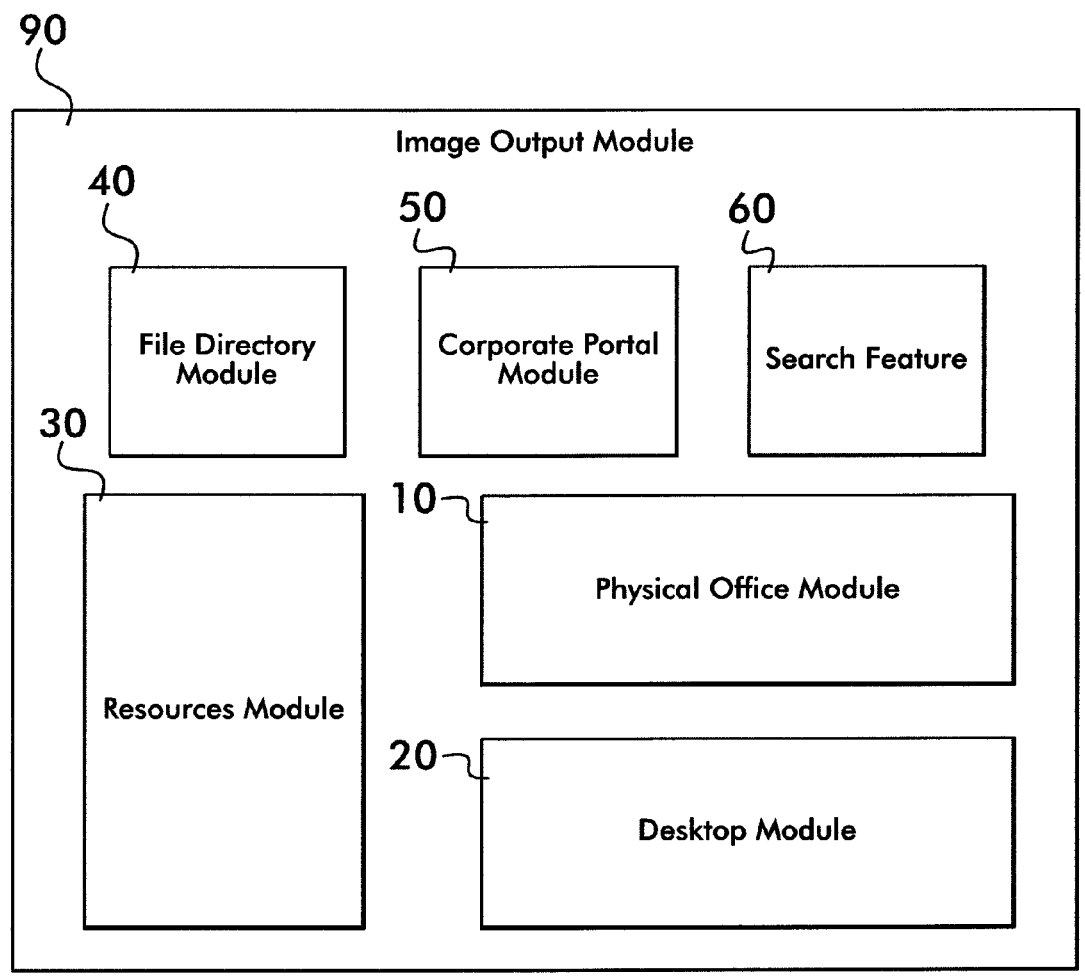
FIG. 2 is a schematic diagram of a GUI for the office management system of FIG. 1.

Referring now to FIG. 2, the image output module 90 allows the virtual office system 1 to display and function as the single view web page. According to the present embodiment, each module functions for a particular purpose and is structurally located within one of several sections of the single view web page, wherein each section is defined by content and function.

Figure 3:
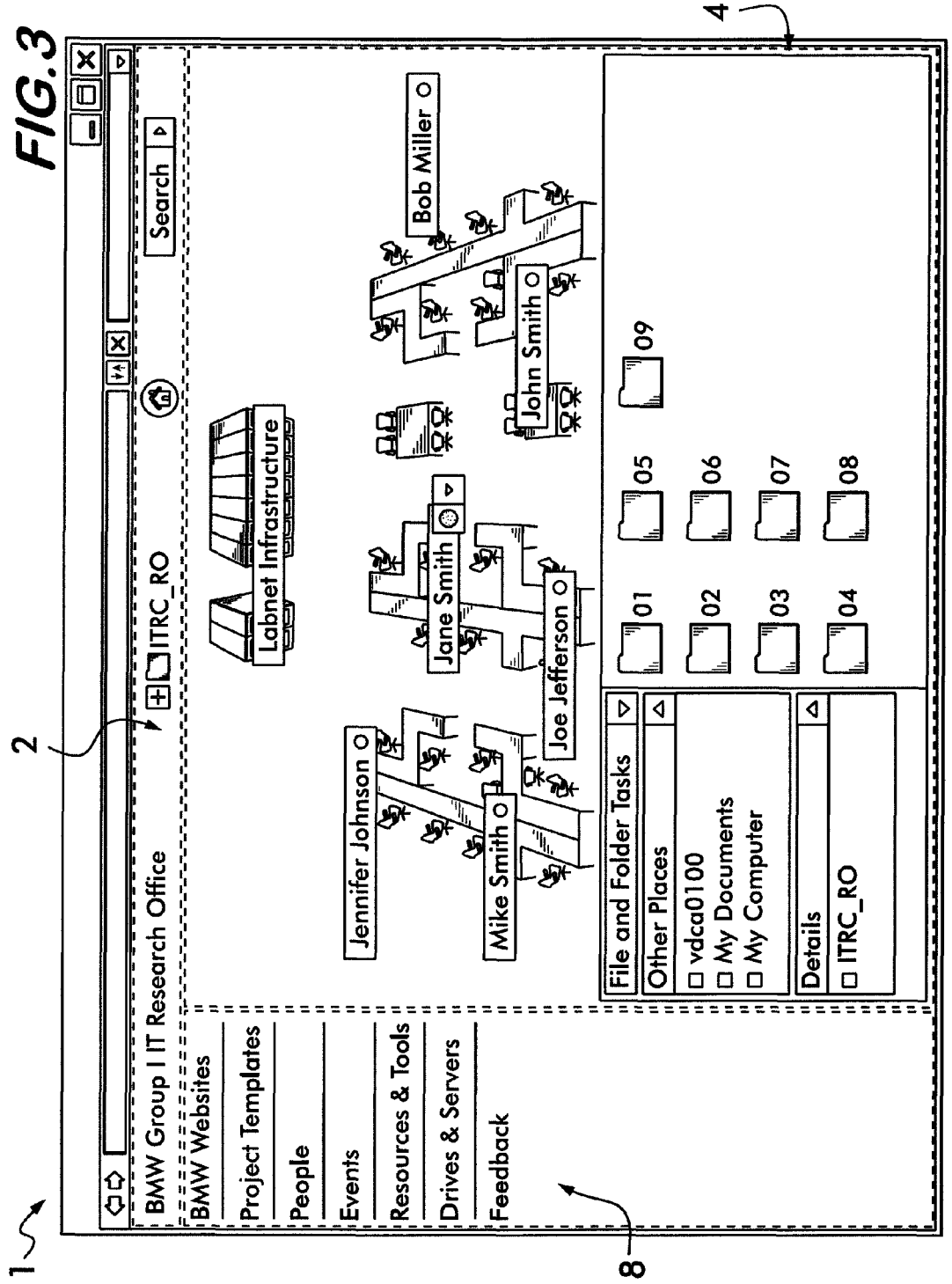
FIG. 3 is graphical representation of the virtual office management system, illustrating a top element, an inline frame, and side element of the single view web page, as displayed through the image output module.
Figure 4:
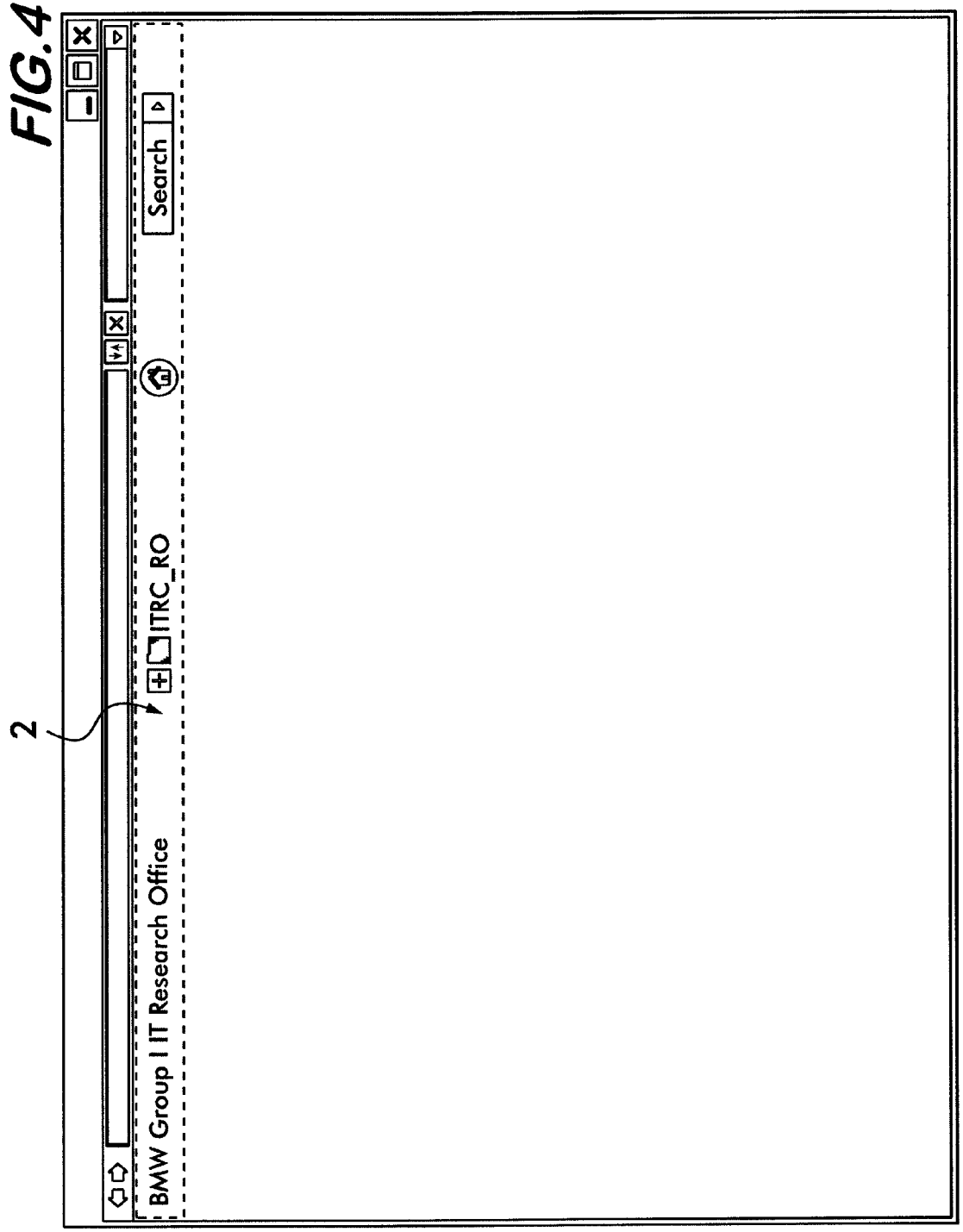
FIG. 4 is graphical representation of the virtual office management system, concentrating on the top element.
Figure 5:
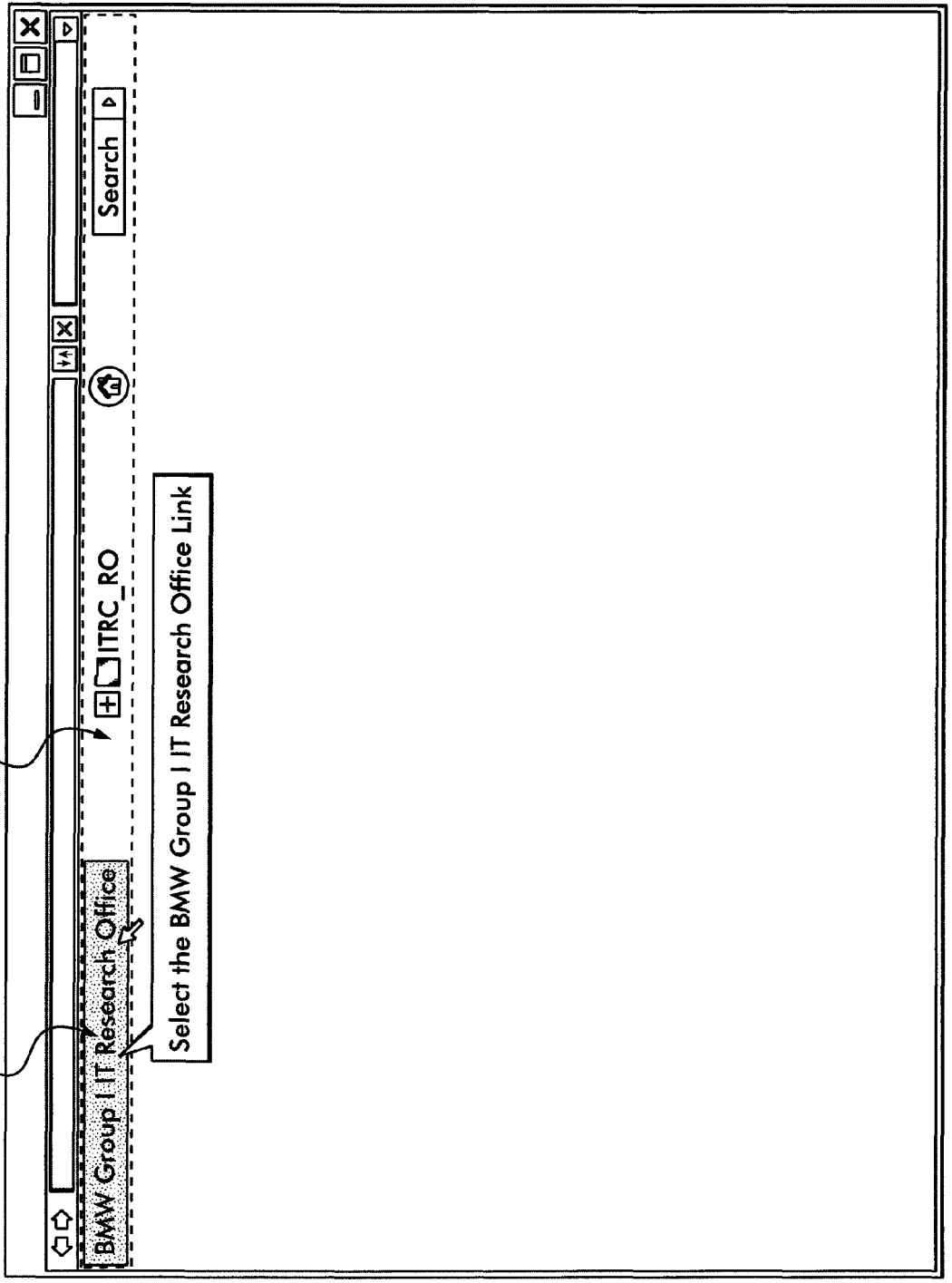
FIG. 5 is graphical representation of the top element of the virtual office management system, concentrating on a reset link.

In viewing FIG. 2 in light of FIG. 3, FIG. 2 simulates the theoretical location of each module, within the single view web page. Using embedded links and language script within the HTML files, a module may be accessed from the single view web page, whereby the end user can command function of that module, in order to access displayable content within the virtual office management system 1. Furthermore, since the virtual office management system 1 includes several defined sections within the single view web page, including at least one inline frame, the end user may access and view separate files and information without having to move away from the system 1.

Functionally, the image output module 90, provides visual display of the information and content provided from the other modules, by means of a monitor, video screen, or the like. Since the virtual office management system 1 runs as a single view web page, made up of HTML files, it is possible to access information from the internet or company intranet.

The physical office module 10 provides a display of a 3-D graphical user interface (GUI) of the physical assets within a managed office space, through a single frame of the virtual office management system 1. The physical office module 10 also connects to the desktop module 20, which allows the end user access to staff member file folders and file content, stored on the company server.

The desktop module 20 provides access to the company server file system, displaying file structure and folder content within another frame of the virtual office management system 1. As a simple graphical user interface, the virtual office management system 1 would be provided whereby the end user not only has direct access and service to staff member files, but is able to view, modify and transfer these files in much the same way you would use windows in a standard operating system or web browser. In fact, the virtual office management system 1 can be implemented using various operating systems, such as Microsoft Windows or Mac OS, as well as Windows Explorer, Internet Explorer or even Mozilla Firefox. However, instead of dividing the a display screen into different areas, where a separate window would run a different program or display a different file, the desktop module 20 is displayed within a single frame of the virtual office management system 1.

In the embodiment shown, the resources module 30 utilizes a series of user resources that include a series of embedded links. Each link would connect to a separate file, application or web page, and is provided as a drill down menu within the single view web page. When requested, by activation of the links, the resource module 30 displays information content and management support within a single frame of the virtual office management system 1. More specifically, the resource module 30 collectively draws in resources, such as websites, folders, templates, personnel information, calendars and event information, drives, servers, office support applications and other assets, that the end user would need to assist in management and oversight of staff employees.

The file directory module 40 provides user access to company files on one or several shared company servers. A typical company server includes a file system, which contains a group of files and/or other directories. Like the desktop module 20, the file directory module 40 may display company file folders through a graphical user interface, much like a file folder window of an operating system.

Since, it is important that the end user have access to files across a companies shared server system, the file directory module 40 provides immediate access to these file structures. Embedded link, within the single view web page, connects the end user to thousands (or even hundreds of thousands) of directories. The file directory module 40, like the preceding modules, connects to the user to the image output module 90, capable of display server file systems within a single frame of the virtual office management systems.

Generally, company files are kept in an organized manner, storing related files in the related directories, within large shared severs. The file directory module 40 provides the end user immediate access to those files. Furthermore, since the contents are displayed within a single frame of the virtual office management system, the end user can navigate through the shared servers using a unitary link, without leaving the system 1.

The corporate portal module 50 provides immediate access to a companies' document-management platform, such as SharePoint, which further offers service as a collaborative web space. Announcements, news, personal announcements, projects, documents, team web pages, blogs, applications, and other features are accessible through the corporate portal module 50. In the traditional sense, a company portal provides employees consistent access to documents and applications through a secure, controlled environment. However, access would be controlled through a separate application and windows. The corporate portal module 50, connected to the virtual office management system 1 by another unitary link, provides user interaction and collaboration with that portal, within as single frame of the single view web page.

Since the virtual office management system 1 is provided as a single view web page, written in HTML with additional JavaScript, the virtual office management system 1 is compatible to run searches across the internet, as well as across the companies' server system. The search feature module 60 is provided to accomplish that task, by utilizing network and web search engine crawlers, in order to locate and generate results found on the network and/or internet. Since the search feature module 60 connects through another unitary link, results and content may be displayed within a single frame of the single view web page.

Now referring to FIG. 3, and according to the present invention, function of each module may be activated through embedded links/tags within several defined sections of the virtual office management system 1, whereby those defined sections are integrated as a the single view web page. Additionally, content drawn from those modules may be displayed through one single frame of web page.

Any number of modules may be added and subtracted from the virtual office management system 1. However, the addition or subtraction of a module should not defeat the intended purpose of the virtual office management system 1, which allows a user to monitor and manage staff member work through a user-friendly three-dimensional Graphical User Interface (GUI) for navigating within a virtual office environment, wherein off-the-shelf software components and support resources are integrated as a single view web page.

Structurally, the virtual office management system 1, with reference to FIG. 3, is visually displayed through the image output module 90, specifically being displayed as the single view web page, and described above. The end user views well-defined sectional parts of the single view web page, and interacts with various modules linked within those defined sections.

More specifically, the single view web page embodies the virtual office management system 1, having a top element 2, a large inline frame 4 of inline content, and a side element 8.

The single view web page is web browser friendly, and compatible to run with any of the commonly known HTML browsers such as Internet Explorer, Mozilla Firefox, Safari, Opera, Lynx, Google Chrome, AOL Explorer, etc. However, the virtual office management system 1 would be compatible with other browsers and any internally developed software applications, which would enable an end user to display and interact with text, images, multimedia and other information typically located on a World Wide Web or a local area network.

The virtual office management system 1, as a single view web page, combines basic internet technologies, W3 standards, basic network topology, HTML programming language and Central Processed Unit (CPU) applications in a resulting HTML web page that is unique in deployment, integration and resulting function. The virtual office management system 1 integrates these components into an HTML wrapper, which includes a virtual office environment view. That virtual office environment view is displayed within a default "start-page", from which the end user would start during start of the system 1.

The virtual office environment contains the correct placement of physical assets, as well as command over personal file folders and a presence awareness utility (discussed later). Typically, intranet function is deployed on a separate web server in order to have rich functionality. However, the virtual office management system 1 does not need a separate webserver, rather it is limited in deployment to a few files placed on a normal network file server, which are typically held and maintained in existing inventory. Each of these files will be discussed in detail below.

In the embodiment shown, the basic structure of the virtual office management system 1 is created using standard HTML editor, such as Microsoft FrontPage or Microsoft Expression Web. This framework provides further access to various network and web-resources within a unified view, while also providing access to applications and documents, such as Adobe PDF files, Xerox Print Services, and any of the growing number of office support applications, which are deployed via the web or private intranets.

Many known web browsers include utilities, assisting the end user's operation and navigation within the browser, such as a status bar, address bar, title bar, toolbar and tool icons. More importantly, the web browser offers a display window to provide visual content. The display window is essentially the browsers workspace or frame through which the virtual office management system 1 works.

As discussed above, the top element 2, the large inline frame 4 of inline content, and the side element 8 are located within this display window, and the image output module 90 controls how content is displayed in these defined sections. Invariably, each section is content driven, layered with embedded links, furthermore providing the end user access to information, files, and/or resources within a single view web page. Since each section is content driven, each section will be discussed separately.

Referring back to FIG. 3, the top element 2 is a defined section, provided just below the web browser utilities. In the embodiment shown, the top element 2 is of fixed dimension and cannot be moved, minimized or removed. Essentially, the top element is just a defined section of the single view web page. However, it is possible in other embodiments to provide more user control of the top element 2, in both content, location, and size. In addition, the top element may be, in other embodiments, a separate frame within the single view web page.

Figure 9:
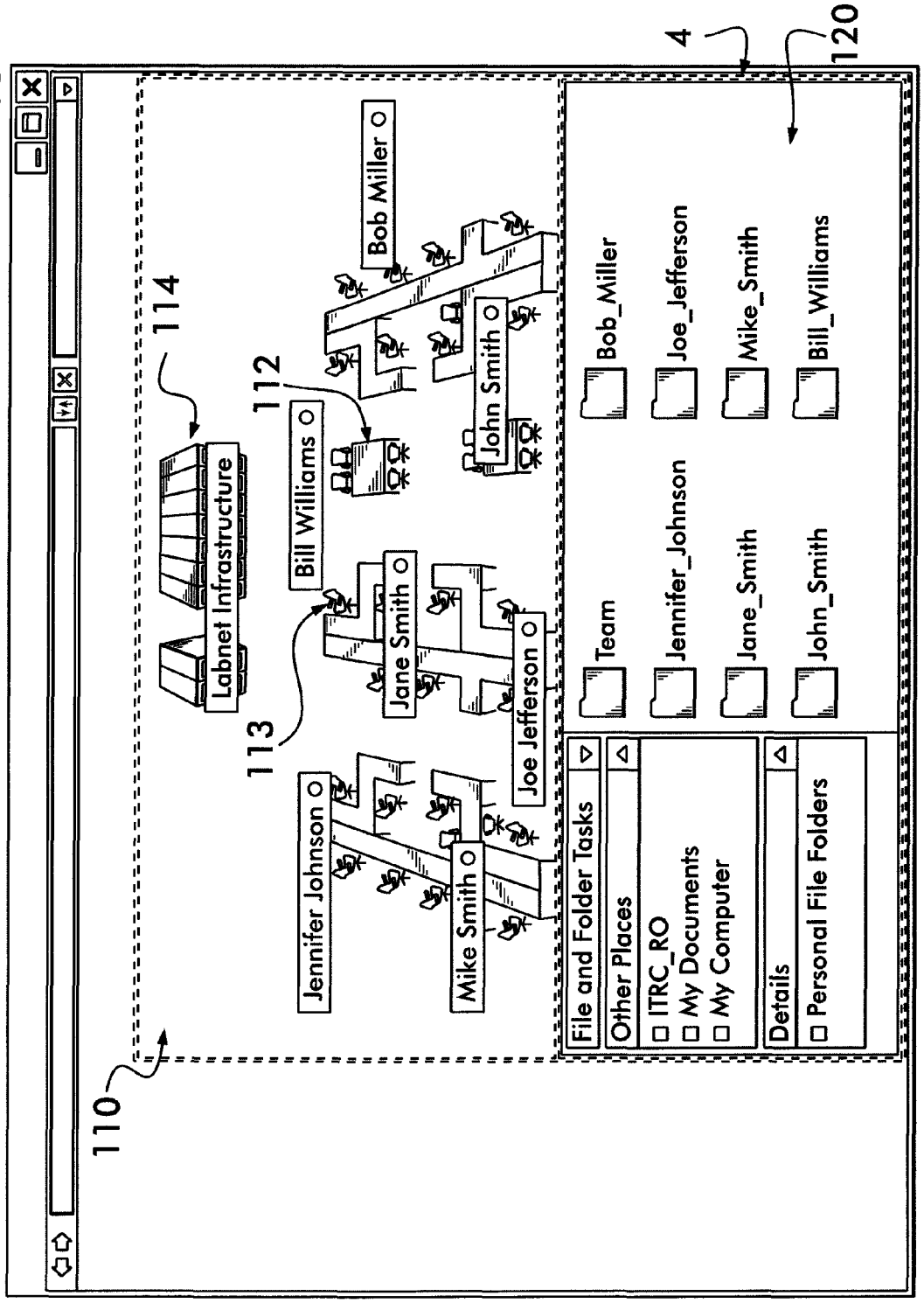
FIG. 9 is graphical representation of the virtual office management system, concentrating on the inline frame.

Whenever the virtual office management system 1 is running, the top element 2 is always visible, and all displayed content and embedded links are available to the end user at all times. The side element 8 in the embodiment shown, too, is fixed and always visible, providing user resources through embedded links anchored into the single view web page. The inline frame 4, however, is capable of being split between a top and bottom inline frame 110, 120 (as shown in FIG. 9). The content displayed within the inline frame 4, top inline frame 110, and bottom inline frame 120 may change depending on what is requested by the end user.

In the default "start page", the display window includes the top element 2, side element 8, and the inline frame 4, which is initially split between a top inline frame 110 and a bottom inline frame 120. As discussed above, the end user may only change content within the inline frame 4, which may include the inline frame 4 as a whole frame, or divisible between the top inline frame 110 and the bottom inline frame 120.

Now referring to FIGS. 4 through 21, the content and elements of these individual defined sections will be further discussed, as will access and control to the virtual office management system 1 modules. In fact, it is the modules that control what content is viewed within the inline frame 4.

In order to stress and concentrate on aspects and features of the virtual office management system 1, one or more of the frames may be concealed within the foregoing figures.

Now, the essential elements within the top element 2 are discussed with reference to FIGS. 3-8.

As discussed above, the fixed top element 2 is always visible, and includes shortcuts to at least three of the major components of the virtual office management system 1, including the file directory module 40, the corporate portal module 50, and the search feature module 60. Each of the aforementioned modules may be accessed through an embedded link, which when selected commands the module to display specific content within the inline frame 4, as a whole.

Therefore, the inline frame 4, which starts split between a top inline frame 110 and a bottom inline frame 120, is no longer divisible and displays content within the entirety of the inline frame 4.

Additionally, the top element 2 includes a reset tool 101. This reset tool 101 functions as a link to code that resets the virtual office management system 1, and is structurally embedded within the single view web page, allowing the end user to start back to the default "start page". And since the top element 2 is always visible, while the user operates the virtual office management system 1, the fixed reset feature tool 130 will allow the user to navigate back to the "start page" at any time, wherein the inline frame 4 is initially split between a top inline frame 110 and a bottom inline frame 120 of inline content. However, it is possible that other embodiments would allow the user to dictate the content of the default "start page", much like the home page of browser can be altered.

Figure 6:
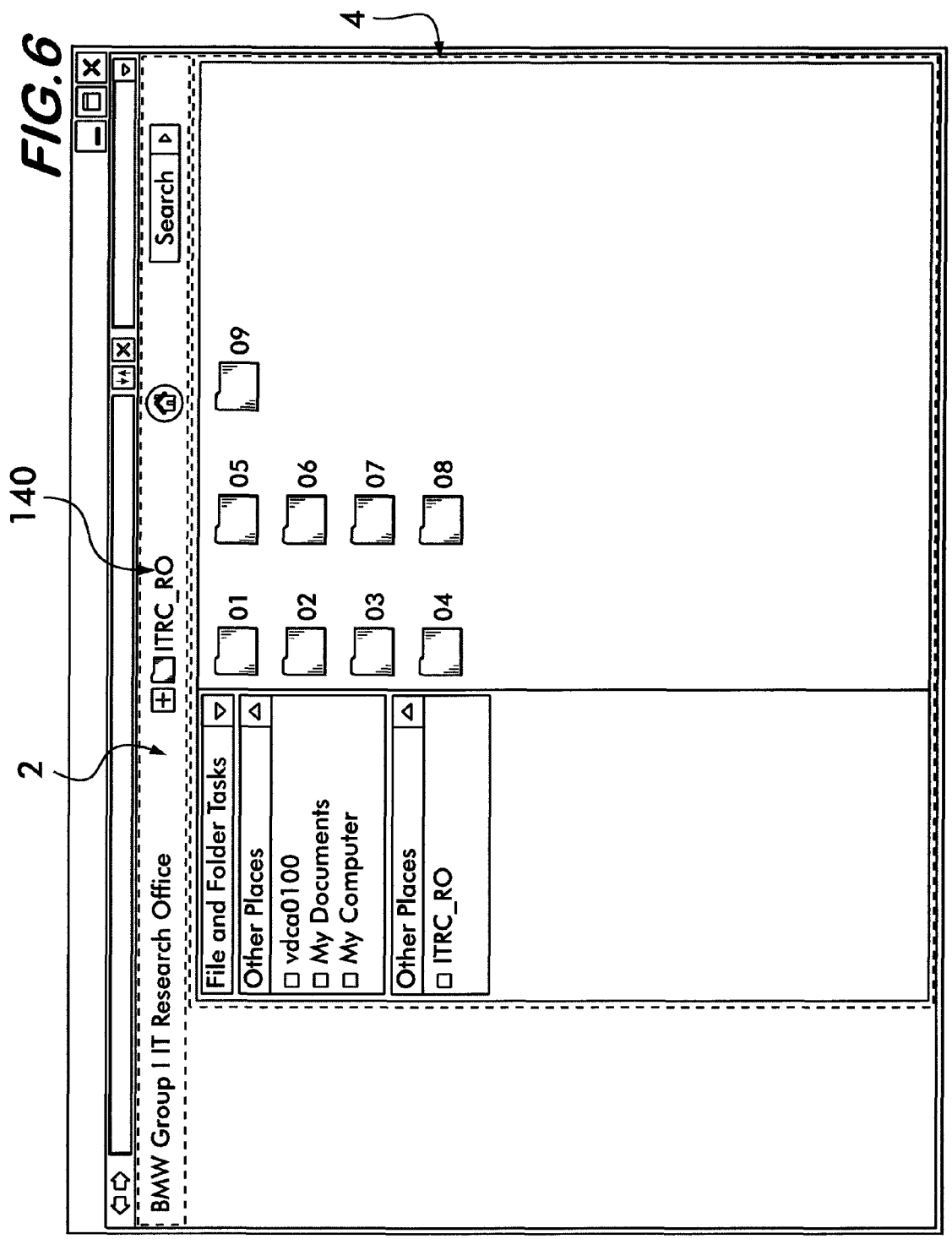
FIG. 6 is graphical representation of the top element of the virtual office management system, concentrating on a file directory shortcut link as well as the inline frame.

FIG. 6 illustrates a file directory link 140 within the top element 2, which links to the file directory module 40. Once activated, the file directory link 140 commands the file directory module to access and display shared server file systems, including a group of files and/or other directories, within the inline frame 4 as a whole.

In the embodiment shown, the file directory link 140 is an embedded hyperlink, providing direct access to a default file directory on one or more shared servers. However, the path to a specified file directory may be changed, in order to limit or expand the scope of access afforded to the end user. This may depend on the end users authority, management needs, or desirability. It may be advantageous to narrow down to a specific file directory on one shared server, or allow the end user with complete access within the shared servers.

The action and style of the file directory link 140, as with any of the other links within the virtual office management system 1, can be specified using the Cascading Style Sheets (CSS) language. In the present embodiment, the user only needs to hover a mouse pointer over the file directory link 140, and left click the mouse to activate the file directory module 40. Once activated, the file directory module 40 commands display of the default file directory within the entire inline frame 4. The user is free to access and navigate files and folders, as the user would in a windows based operating system, however, the virtual office management system 1 allows the user to access and navigate these files within a single view web page, without cascading and/or tiled windows.

Figure 7:
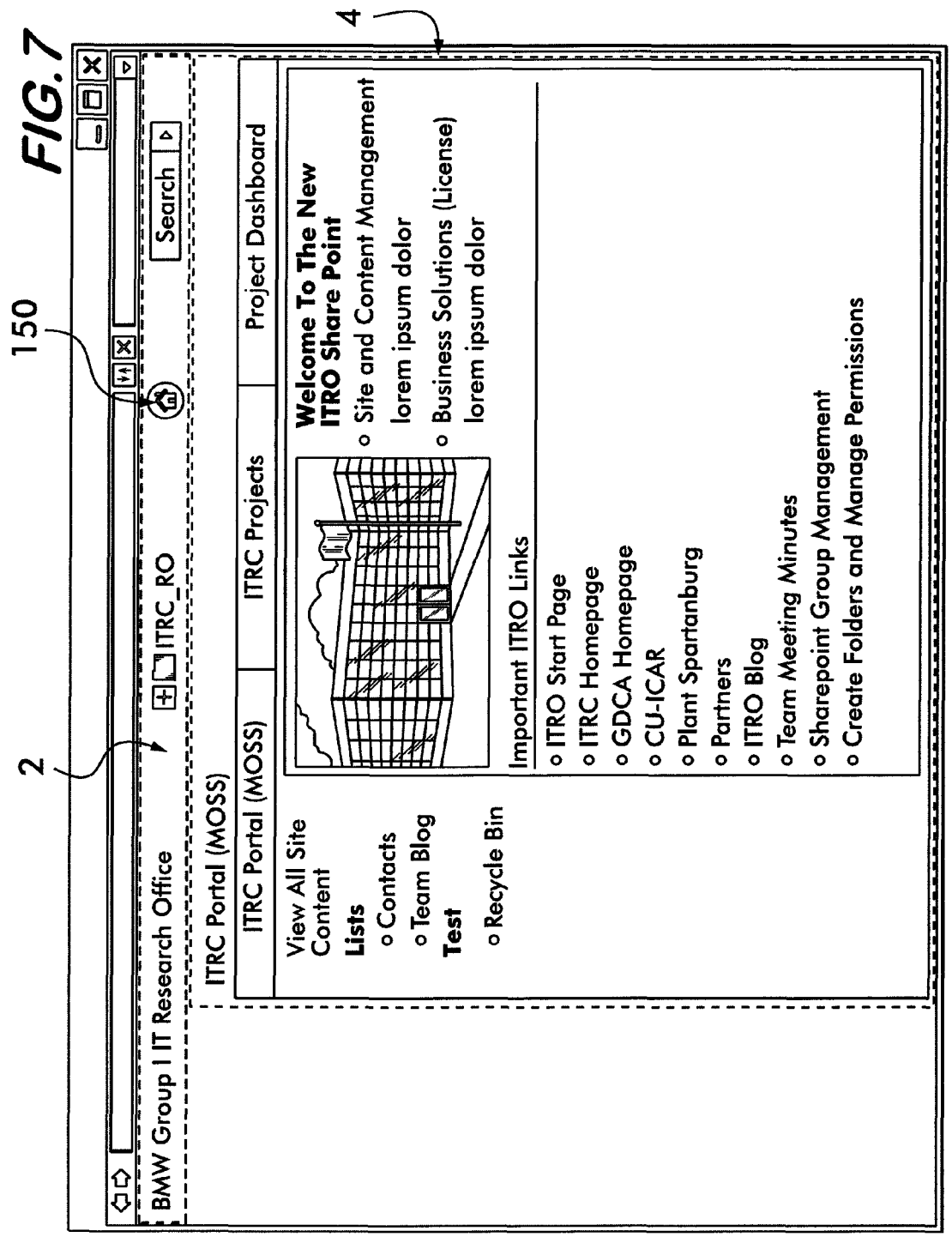
FIG. 7 is graphical representation of the top element of the virtual office management system, concentrating on a document management shortcut link as well as the inline frame.

A corporate portal link 150, as displayed in FIG. 7, performs in the same manner as the file directory link 140, except the corporate portal link 150 displays content though the entire inline frame 4, using the corporate portal module 50. And instead of displaying a window based file directory, the inline frame 4 displays a document-management platform. The document-management platform is a stand alone application, such as SharePoint, but can be accessed through the inline frame 4 of the virtual office management system 1, instead of through separate windows. The user is free to navigate and access announcements, news, personal announcements, projects, documents, team web pages, blogs, applications, and other features through the inline frame 4. In the embodiment shown, Sharepoint is a run through a web portal. Therefore, a hyperlink is used to fill the inline frame 4 with Sharepoint content, setting the hyperlink to the inline frame rather than "new", "blank" or "self" in the html tag.

As discussed above, if the end user wants to navigate out of the document management system, the end user needs only to mouse click on the reset feature tool 130. The virtual office management system 1 will then reset back to the default "start page" (see FIG. 5).

Figure 8:
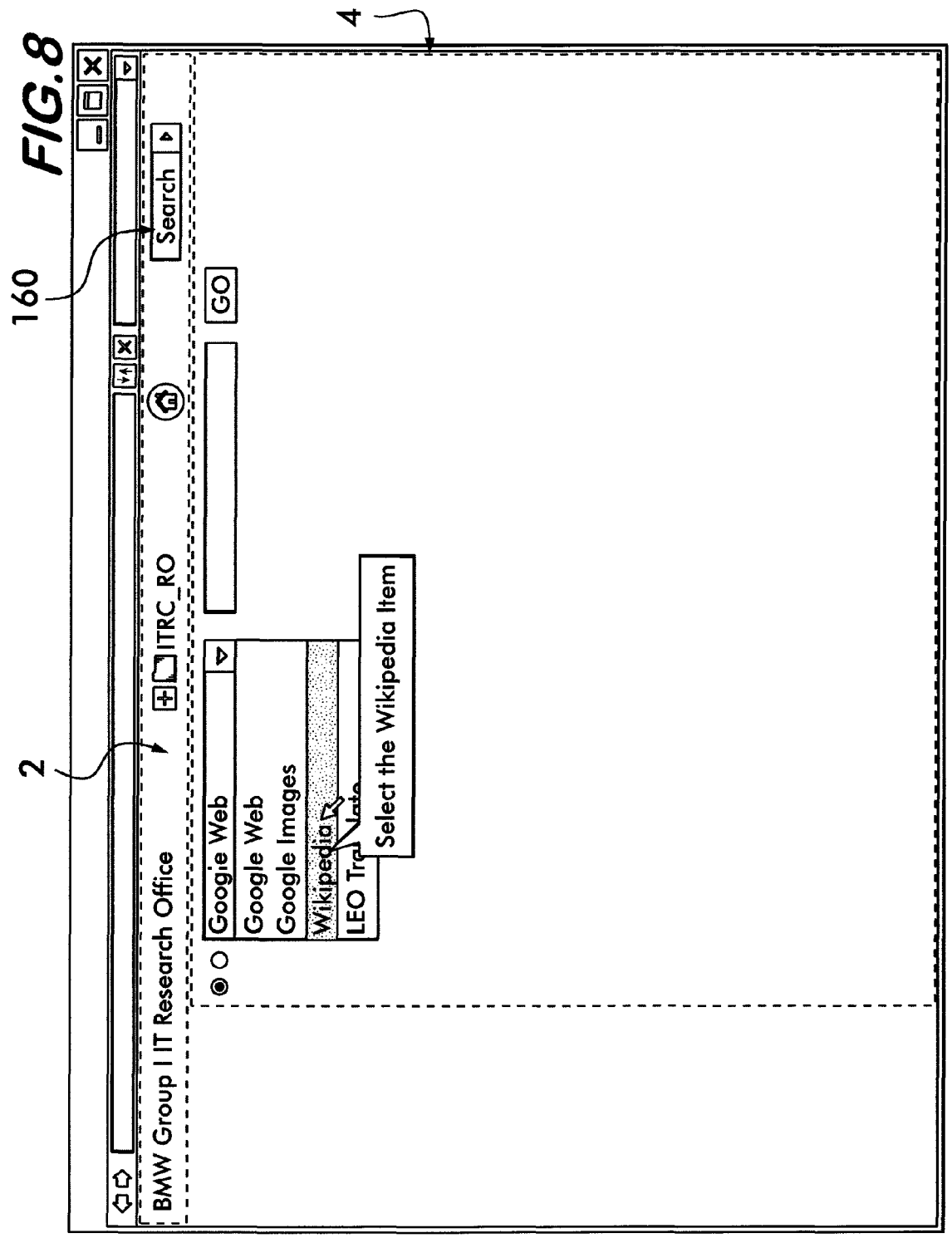
FIG. 8 is graphical representation of the top element of the virtual office management system, concentrating on a search feature link as well as the inline frame.

According to the virtual office management system 1, and now referring to FIG. 8, the top element 2, one defined section, is illustrated, including a search feature link 160 that activates the search feature module 60. The search feature link 160 and search feature module 60 pulls up a search page, within the entire inline frame 4, whereby the user may configure a search query by entering the requested search through a data entry field, as shown. Additionally, the search feature module 60 provides drill-down capability, in order to facilitate user search preferences, such as location of search (web, network), type of search (file name, file size, content), and search engine. This provides the user with versatility in search capabilities, without having to leave the virtual office management system 1.

Now discussion of the side element 8 of inline content will be discussed, specifically with reference to FIGS. 17 through 21.

Another defined section, referring to the side element 8, is much like the top element 2, in that the side element 8 is always visible. This side element 8 provides the end user access to a variety of management and computer resources. A collection of embedded links are embedded within the frame, and access the resources module 30, which then retrieves content is to be viewed within the inline frame 4. Menus and sub-menus are also used within the side element 8, in order to organize and classify various user resources.

More specifically, the resource links 130 displays information, websites and embedded content, which may include websites 131, folders 132, templates 133, staff member information 134, calendar and event information, drives servers and other assets 135. Examples of each of these can be seen by drilling down within the series of resources links 130, including the menu shown in FIG. 21.

As discussed with links of the top element 2, the series of resources links 130 that reference to another document, file, website, or file folder that is then displayed as requested content within the inline frame 4. Indeed, these links are capable of providing access to a variety of applications and documents such as Adobe PDF files, Xerox Print Services, and any of the growing number of office support applications and resources. Each of which are deployed via the web or private intranets and then capable of being accessed through the inline frame 4. This provides the advantage of viewing and interacting with a variety of information within a single view web page, instead of the common cascading and/or tiled display windows within a common operating system.

Figure 18:
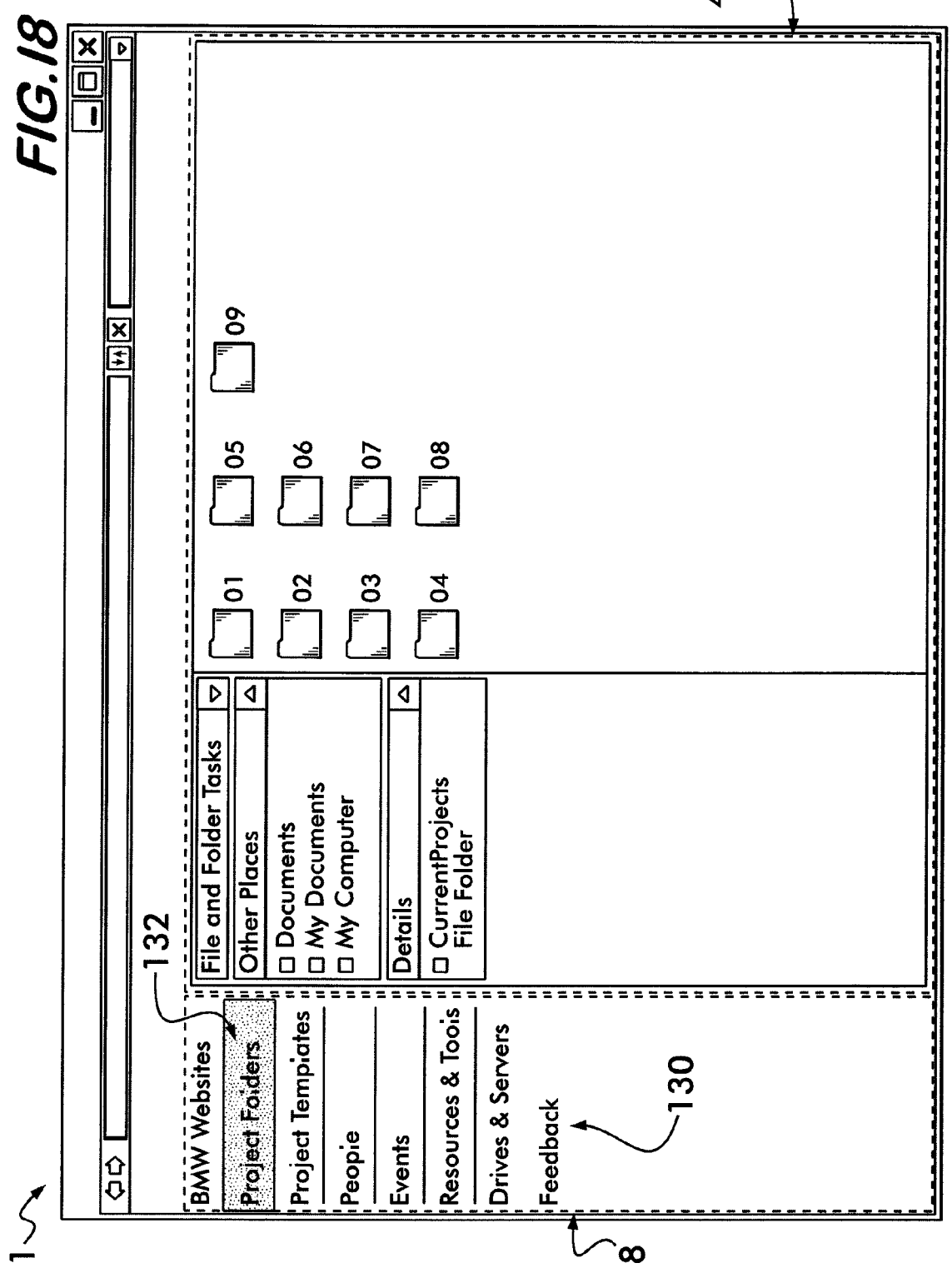

FIG. 18 illustrates user project folders being displayed within another defined section of the single view web page, the inline frame 4. The files and folders are accessed through a link to the project folders 132, which commands the resources module 30 to pull a specified project folder from the shared server, and display that file folder within the inline frame 4. Again, this performed in the same way as any of the other links discussed above.

Figure 19:
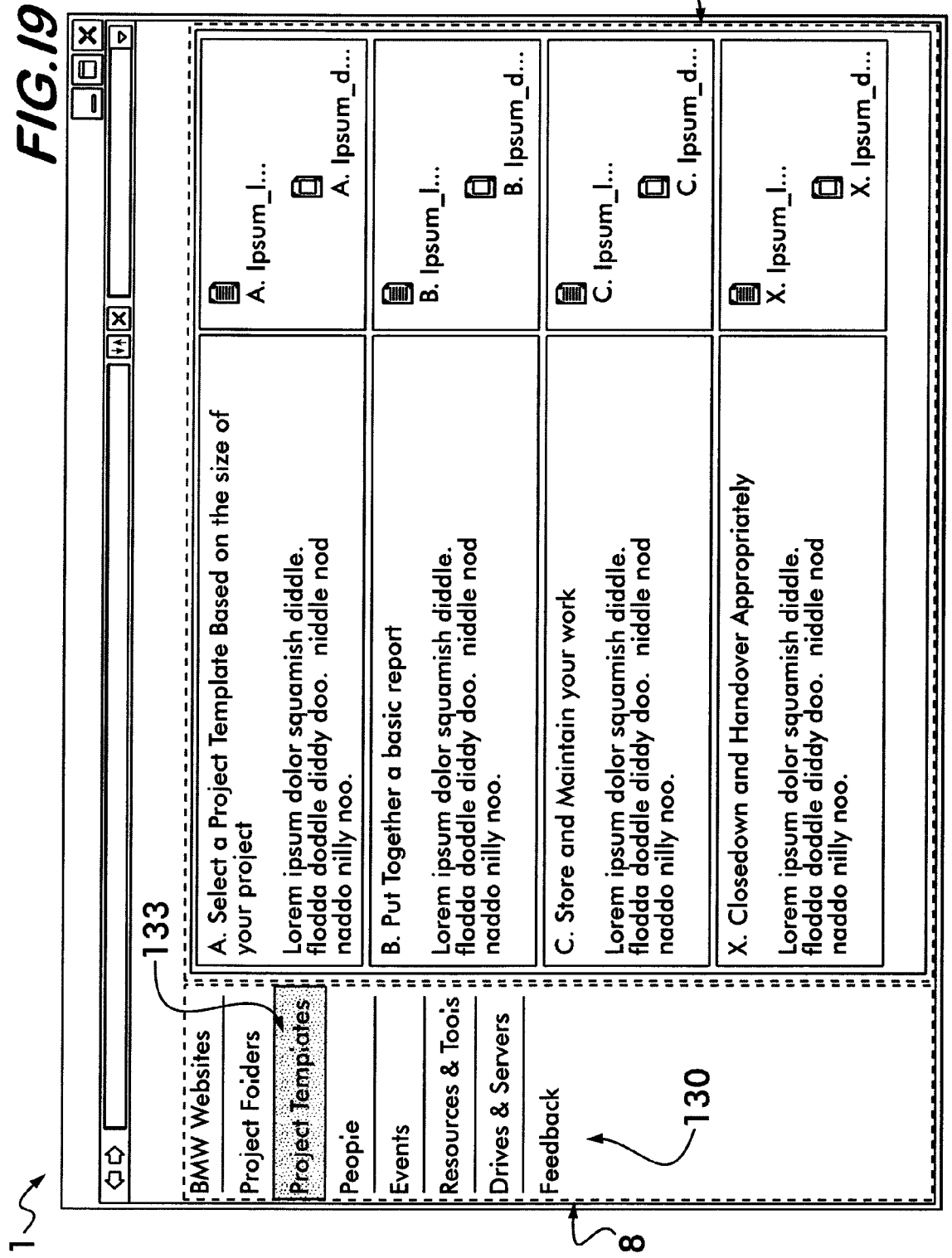
Figure 20:
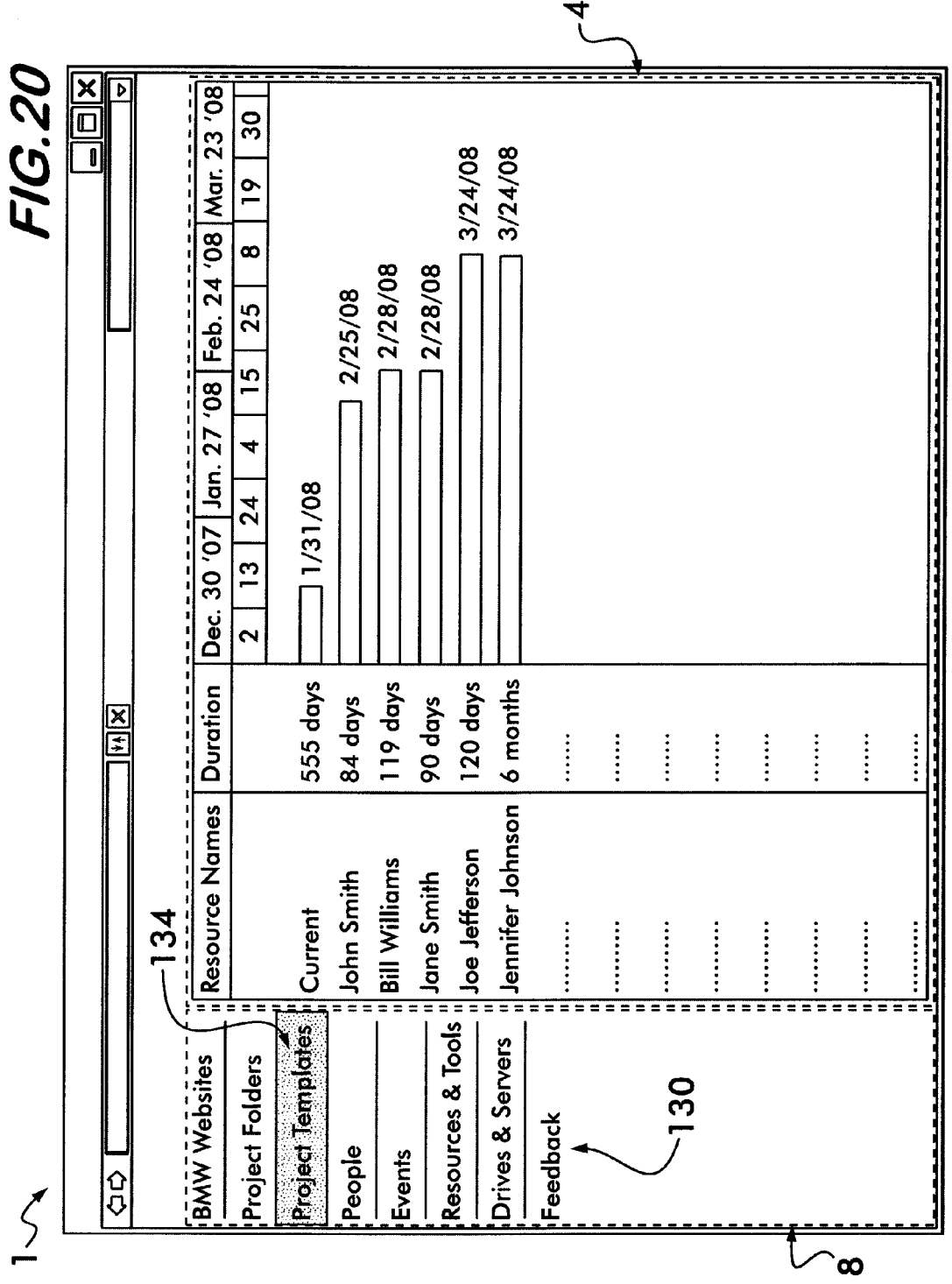
Figure 21:
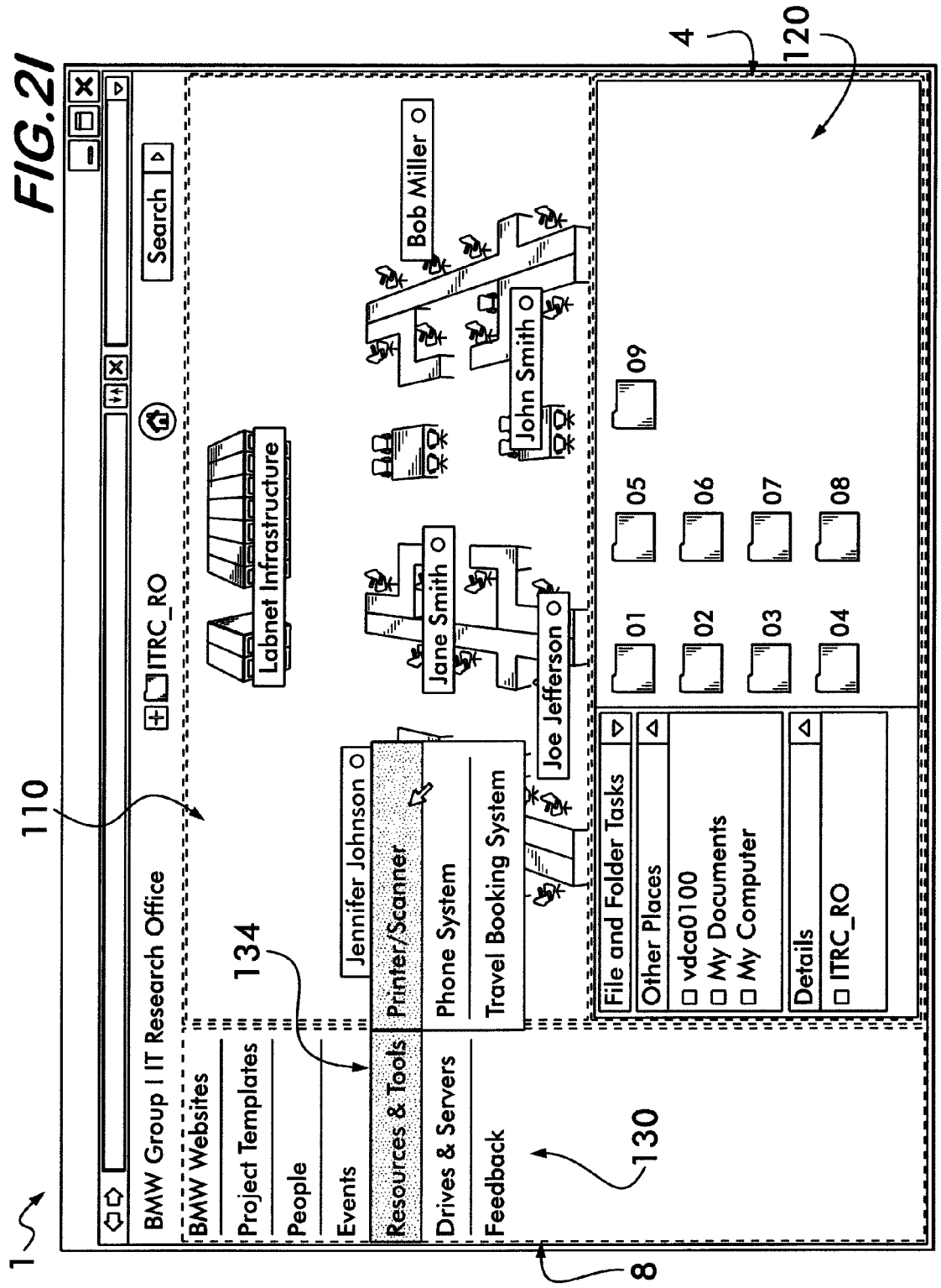

FIG. 19-21 illustrate other user resource links, including a project template link 133, personal information link 134, and resources and tools link 135, which may be accessed within the side element 8. The content of each link, which may be PDF files, Word documents, PowerPoint documents, websites, etc., may be accessed and viewed through inline frame 4, without having to rely on tiled and/or cascading windows. However, the opening behavior of each file is controlled by scripts in the single view web page so that the source template is unchanged and a copy of a new document based on that template is opened in the native application such as MS Word, MS PowerPoint, Etc.

Any of the resource links, along the side element 8 or in any of the menus/sub-menus may be modified to user preference or authority, prior to use.

Now, discussion regarding the aspects of the inline frame 4 and content will be discussed, specifically in reference to FIGS. 9-16.

FIG. 9 shows the inline frame 4, which may be split and divisible between the top and bottom inline frame 110, 120. Display within the inline frame 4 is content controlled, and is positioned within the virtual office management system 1 substantially in the center of the single view web page. As discussed above, the entire inline frame 4 may be populated with user requested content from a variety of links embedded within the single view web page, which may include file folders, documents, web pages content and/or user resources.

In the default "start page", the inline frame 4 is divisible between the top inline frame 110 and the bottom inline frame 120, where the size of either one may be adjusted by the user. Adjusting the size of these frames may be performed in the same way that an end user can adjust the size of a standard operating system window, or even a standard frame within a common web browser. When the inline frame 4 is split, the content displayed within the top inline frame 110 is controlled by the physical office module 10.

As displayed in FIG. 9, the top inline frame 110 illustrates a realistic view of a physical office environment showing physical assets, which may include desks and chairs 112, computer infrastructure 114, printers etc. In the embodiment shown, the physical office environment is a three-dimensional representation of a department floor plan. Physical assets have been added, as well as a listing of staff members positioned within the office. Each staff member is positioned appropriately within the three-dimensional image, by configuring seating assignments 113. Each staff member, indicated by a seating assignment 113, is appropriately placed within the image, using layers written into the web-page html code. Each seating assignments 113 is a css <div> tag. As a result, each <div> tag, in HTML code, is a tag that defines logical divisions within the top inline frame 110. The <div> tag defines sections of a single view web page to make it easier to manage, style, and manipulate. Therefore, placement of the <div> tag, which is positioned to a unique location, provides a way to divide seating assignments within the top inline frame 110 in a robust way.

In the embodiment shown, each <div> tag is positioned within a desk or workspace of the three-dimensional office environment. These <div> tags are used to allocate a space for individual staff members, while a link positioned within this space connects to individual staff member content.

Each staff member has a named directory on the network server. This is where each staff member saves his/her files. It is important that the virtual office management system 1 end user is capable of accessing these files. Therefore, a single link is embedded within each seating assignment 133, which is allocated by the <div> tag. This link connects to a respective staff member directory, and a content of that directory is viewed within the bottom inline frame 120. This allows the user direct access to network and personal folders without having to leave the virtual office management system 1, which runs as a single view web page. Any of the files within these personal folders may be selected, retrieved, and viewed within the entire inline frame 4, using the virtual office management system 1.

With respect to other assigned physical assets, such as the servers 114, printers and other office fixtures, other links may be embedded within the three-dimensional office environment that then connects to supporting documentation. For instance, in FIGS. 11 and 12, the user has selected a link embedded within space allocated as the server 114 infrastructure. When that link is selected, a file folder containing documentation, regarding that server, is displayed in the bottom inline frame 120. The end user may select any of these files, which will then be displayed with the entire inline frame 4, i.e. specific sever information 116 seen in FIG. 12.

As discussed above, the physical office environment is represented as a GUI and created by input from a suitable three-dimensional graphical representation of a floor plan. This representation may be created, for example, with readily available software products such as Google SketchUp and exported as an image file such as a GIF, JPEG, or PNG.

In the embodiment shown, the simple but realistic view of the physical office is exported as a two dimensional image with perspective, as a JPEG image. This JPEG file becomes the base presentation layer of the top inline frame 110. Assets such as server racks 114, hardware (113, 112) and other infrastructure are layered into this image, as well. Accordingly, the basic components (walls and floor layout) are created on one layer of the imported image, while the assets are provided on another layer of the imported image.

Figure 10:
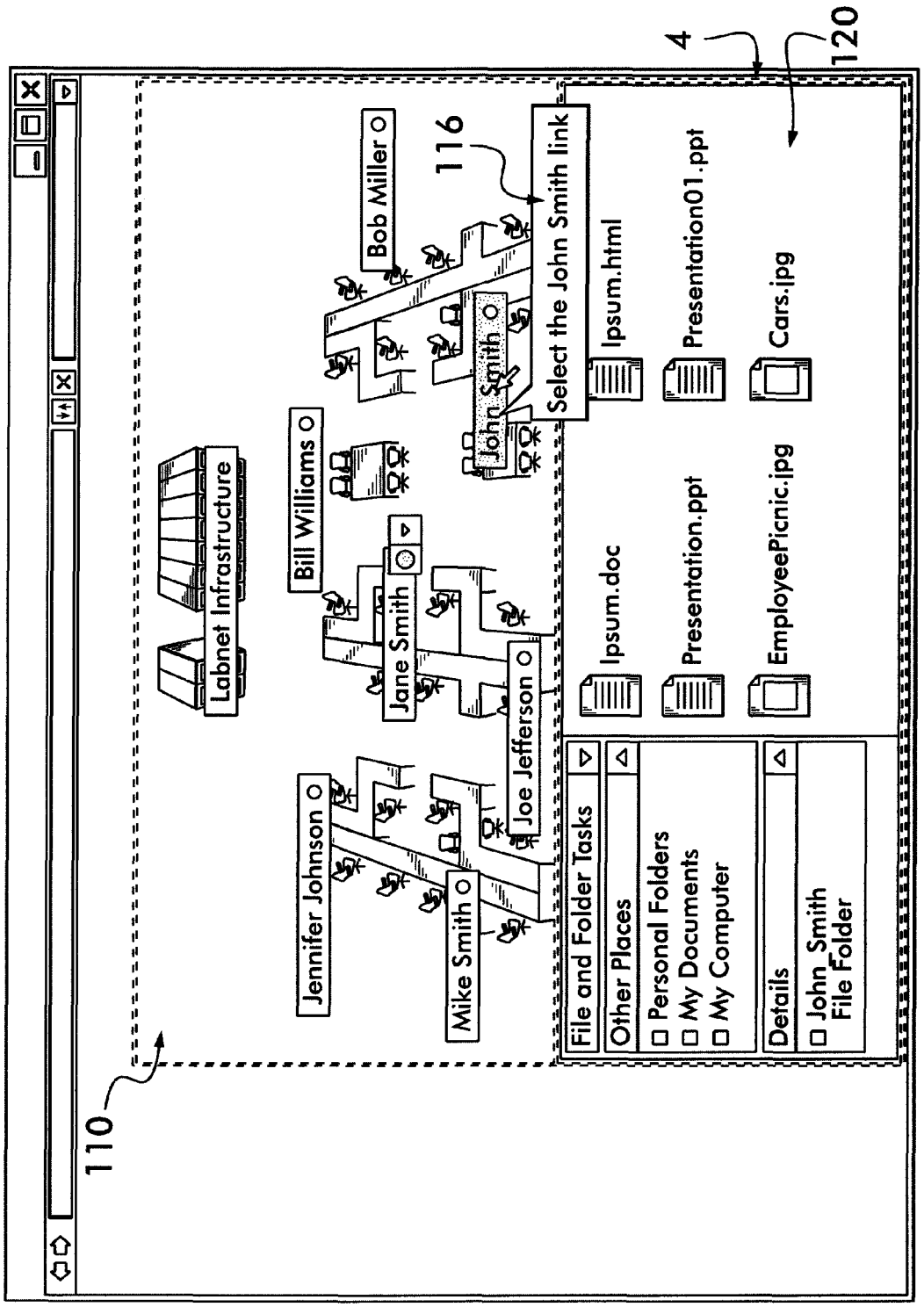
FIGS. 10 and 11 are graphical representations of the virtual office management system, concentrating on a top and bottom section of the inline frame.
Figure 11:
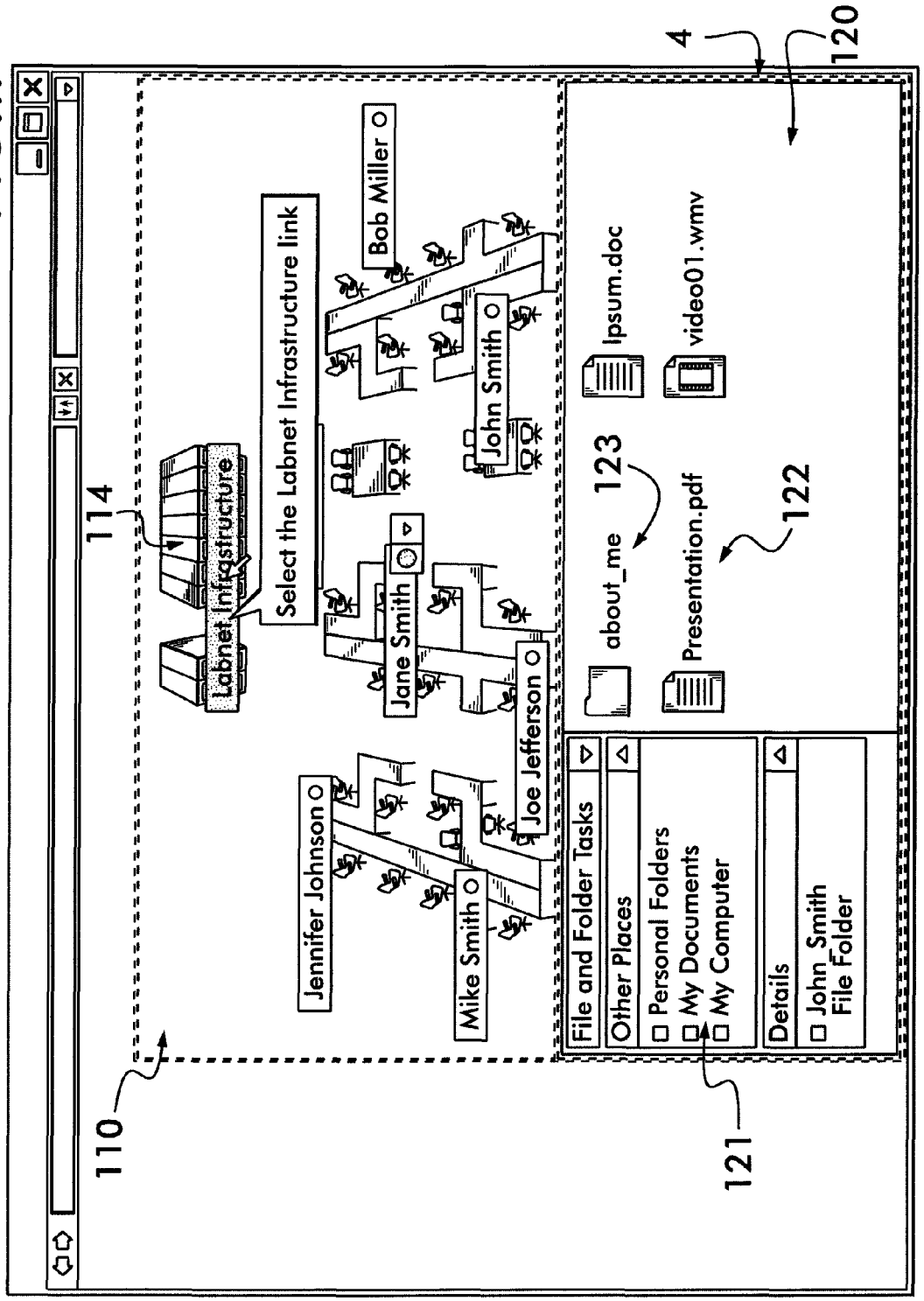
Figure 12:
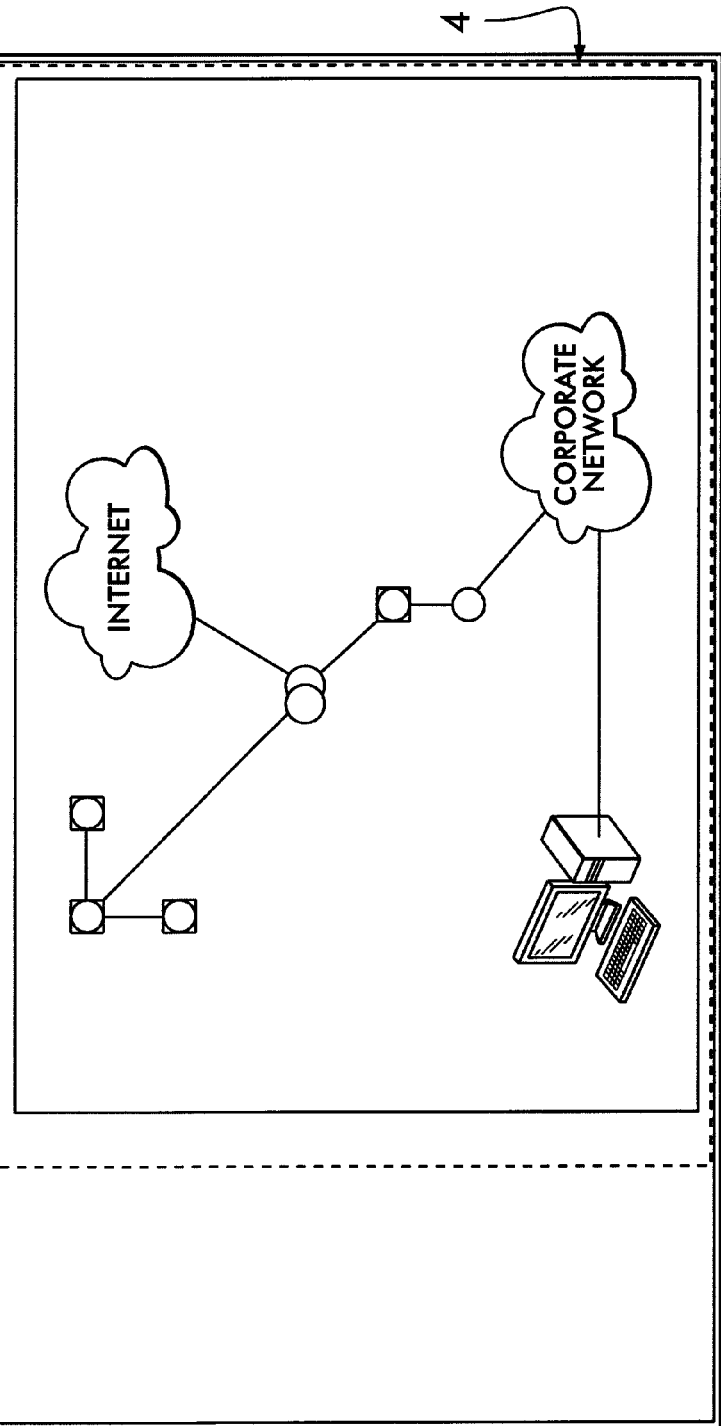
FIG. 12 is graphical representation of the virtual office management system, concentrating on viewing external information through the inline frame.

The physical office module 10, in this embodiment, is coded using HTML, in an index file and is displayed within the top inline frame 110, as shown in FIG. 10. In the index file, the <div> tags and personal directory links are applied within the image, by overlaying each onto the imported image. As discussed, each <div> tag maintains special relationship to a staff member or physical asset, while the links provide access to files and information related to those staff members or physical assets.

Ease of maintenance is incorporated into the design of the virtual office management system 1, so that adding, deleting or changing names or placement of a staff member or physical asset within the three-dimensional office environment is accomplished easily on a separate layer, without changing the underlying JPEG image.

Additionally, metadata is also available for each physical asset, and display of that metadata is available by mousing the pointer over the physical asset. Adding menu items or submenus to the asset, within the top inline frame 110, is as simple as adding an unordered list <ul> or list-item <li> within the HTML page code.

As discussed above, the user may request information regarding a particular staff member or physical asset, by clicking on a link. This will access information (files and folders), which is then displayable in the bottom inline frame 120. Any requested information is retrieved through the physical office module 30, and such may be linked or otherwise accessed from shared server resources or local drives. Information may include files such as PDF files, Word documents, Excel documents, access databases, or any other file format, as well as file systems and applications.

Figure 13:
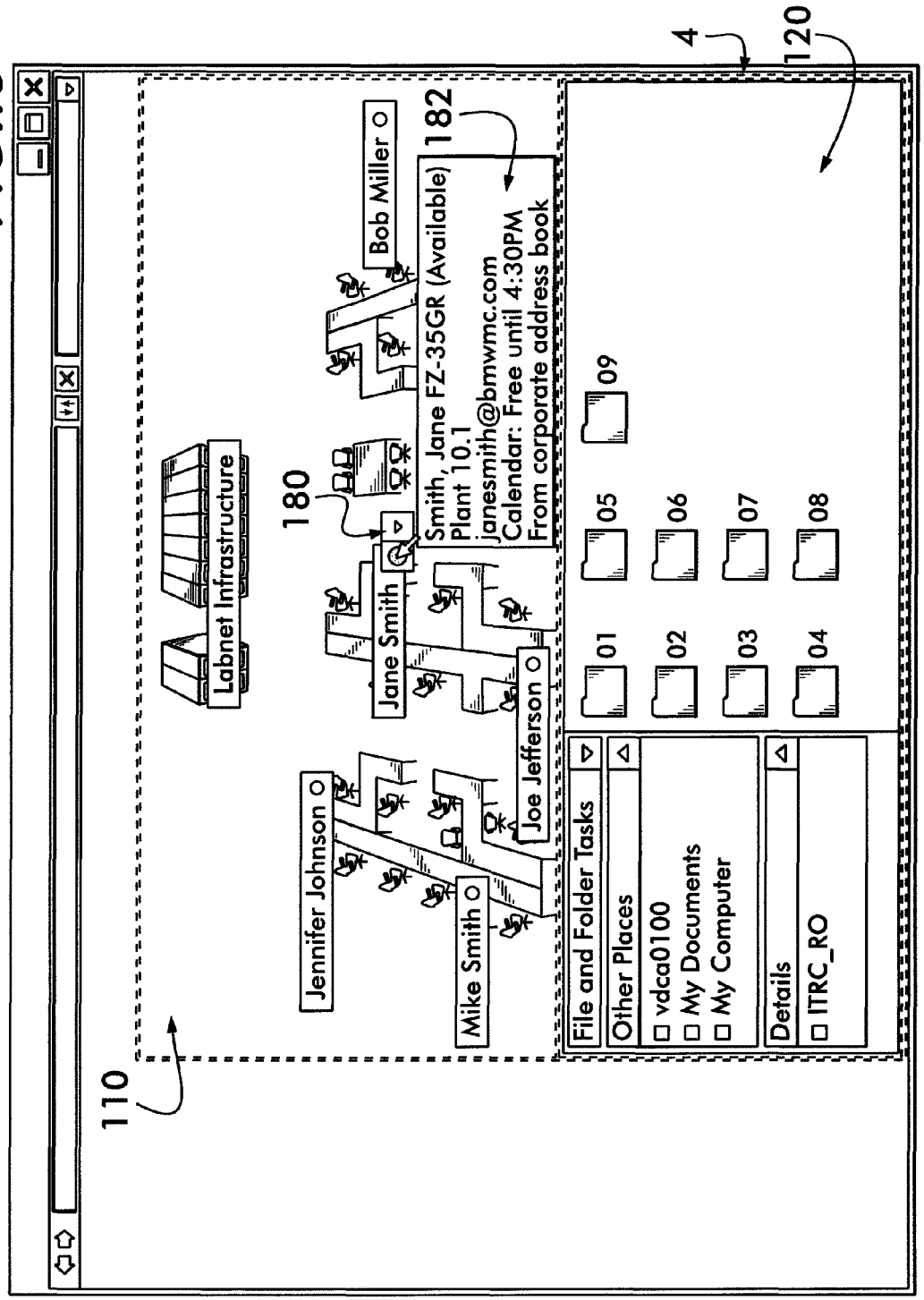
FIGS. 13 through 16 are graphical representations of the virtual office management system, concentrating on an presence awareness and communicator feature in the top inline frame.

Additionally, a presence awareness utility is provided within the physical office environment, using the physical office module 10. Presence awareness allows the user to determine whether a person is present, as shown in FIG. 13. The presence awareness utility may be executed in a number of ways, for example using mouse-over a presence awareness bubble 180 or clicking features to display one's presence status 182.

Each bubble 180 is a JPEG image/file that is also layered over the imported image. The presence awareness utility, of the physical office module 10, is provided using Microsoft code samples for interacting with Microsoft Communicator, and layered onto the web-page using <div> tags as well. The embedded code provides active presence awareness, which is activated using a mouse-over a specific placement of a presence awareness bubble 180, adjacent to a staff member seating assignment 133.

Figure 14:
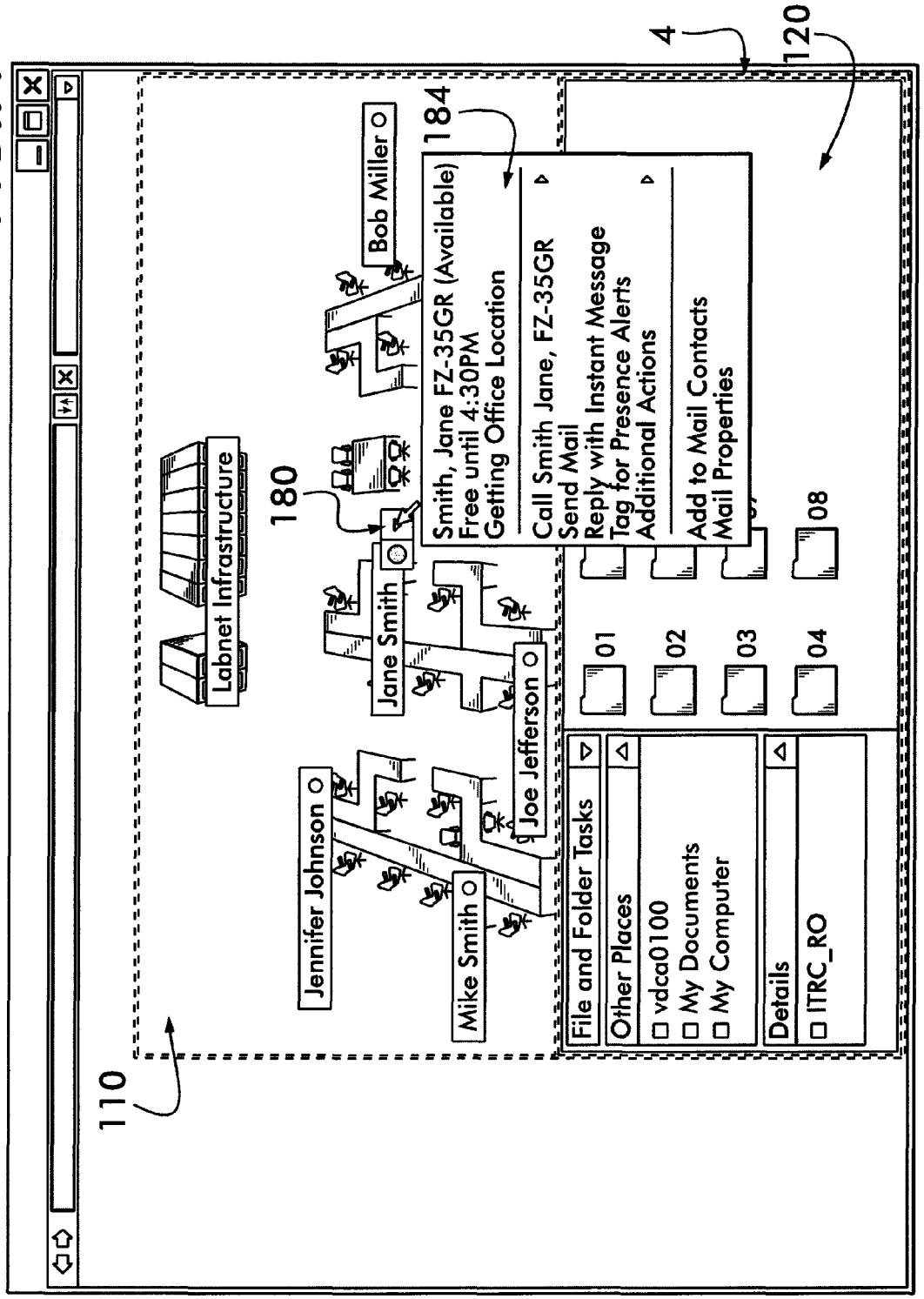
Figure 15:
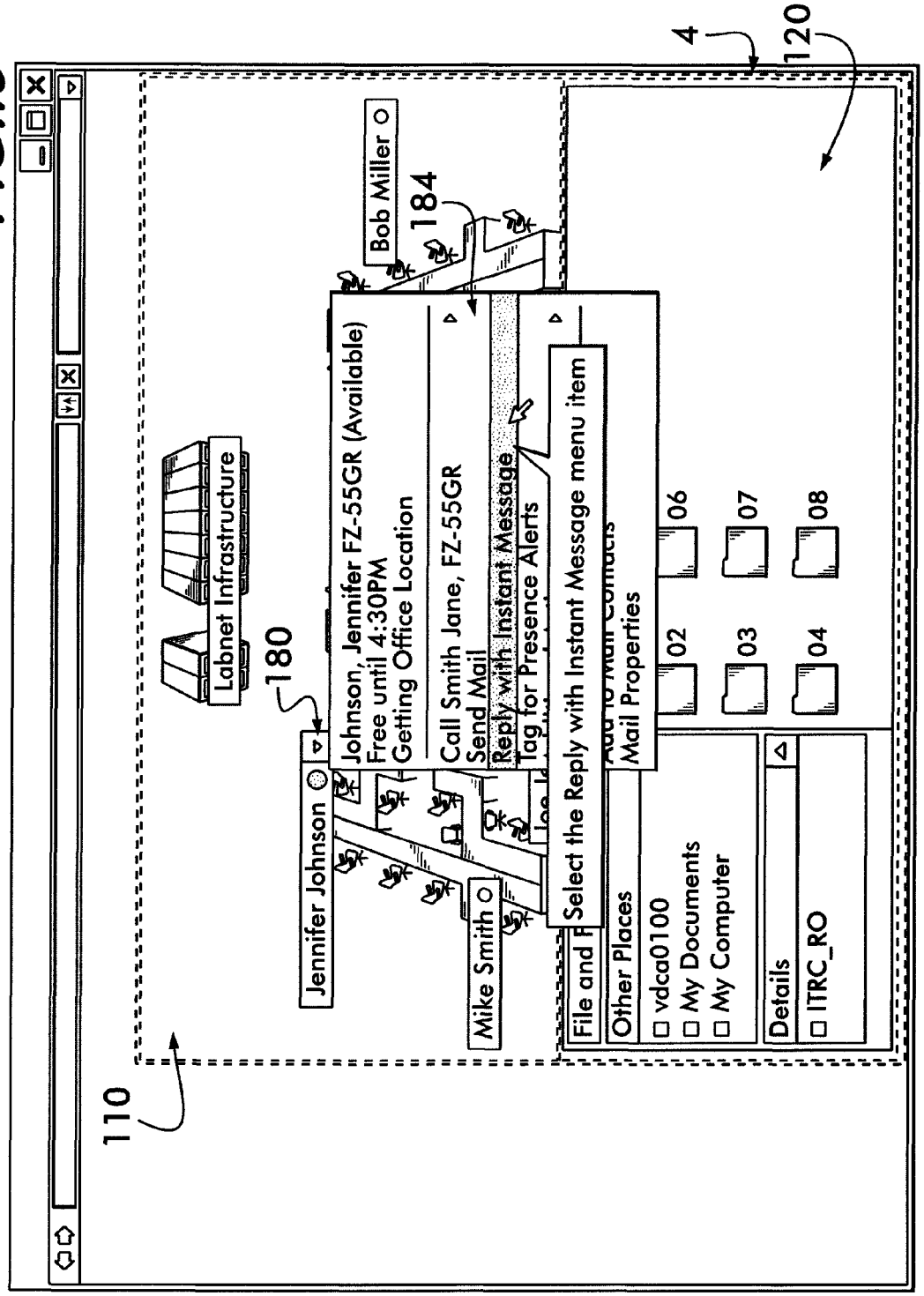
Figure 16:
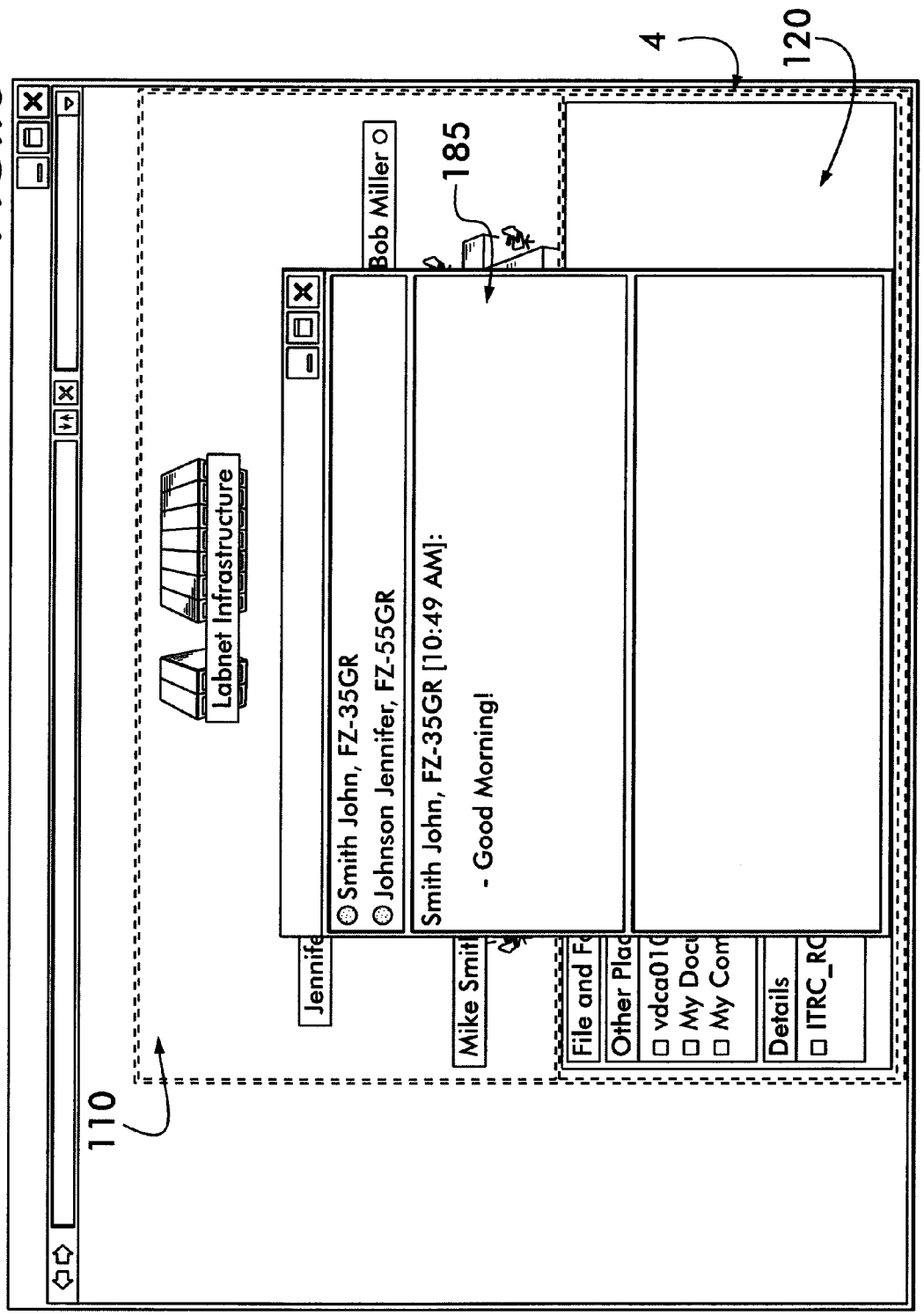
Figure 17:
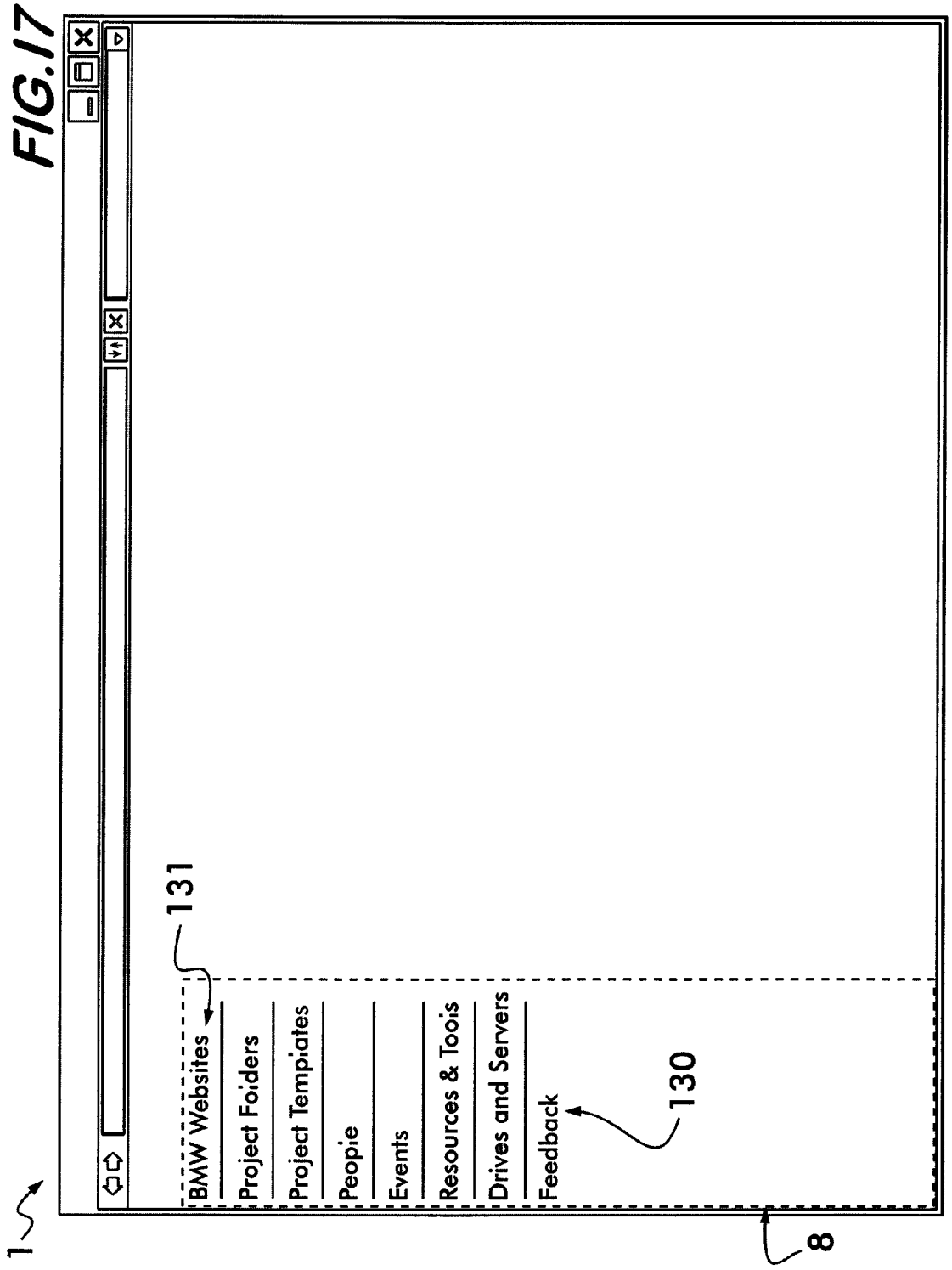
FIGS. 17-21 are graphical representations of the virtual office management system, concentrating on the side element, and specifically resource module links.

Once the presence awareness utility is activated, staff member presence status 182 is displayed. However, the end-user can also initiate a chat session, schedule a meeting, or ask for a document that can be dropped into a network folder by one mouse-click on the name of the staff member, as shown in FIG. 14. This presence awareness utility, used in conjunction with the physical office environment of the top inline frame 110, keeps files off an email exchange server because there is no further need to email the document. Further, the combined file structures and presence awareness utility provides management and access to staff no matter where the manager or end user is located, as well as good staff member oversight.

Referring back to FIG. 9, the bottom inline frame 120 is illustrated, displaying folders and data structure that support the physical office environment. The bottom inline frame 120, in default "start page", is configured similar to a standard operating system file folder window. The bottom inline frame 120 displays file structures, shortcuts, icons, network drives, and other typical features displayed on the standard operating system desktop. As best shown in FIG. 9, the bottom inline frame 120, is displayed within a section of the inline frame 4, right below the top inline frame 110. While the top inline frame 110 is a graphical representation of the three-dimensional office environment, the bottom inline frame 120 displays file and folder content linked through the top inline frame 110.

In default, the content displayed within the bottom inline frame 120 is retrieved through the desktop module 20. The bottom inline frame 120 may also be populated with the personal staff member file folders that are specifically linked with within the physical office environment of the top inline frame 110. For example, shortcuts 121, files 122, file folders 123, or other icons may be displayed. The desktop module 20, like the physical office module 10, is coded using HTML, in an index file.

By default, the bottom inline frame 120 is populated, in the embodiment shown, using a SRC HTML anchor commands, which links to an overall team directory, holding all staff member directories. As described above, concerning the top inline frame 110, each embedded link connects to a selected physical asset folder or staff member's folder, which is then displayed as selected content within the bottom inline frame 120. Additionally, the virtual office management system 1 keeps files off an email exchange server as well, because the end user can transfer files into any of the staff member directories. The end user may simply drag files to a selected folder, being viewed in the bottom inline frame 120, without having to prepare an email.

Now, discussion will be directed to the virtual office management system 1 file structure and function, specifically with reference to FIGS. 22 through 25.

Figure 22:
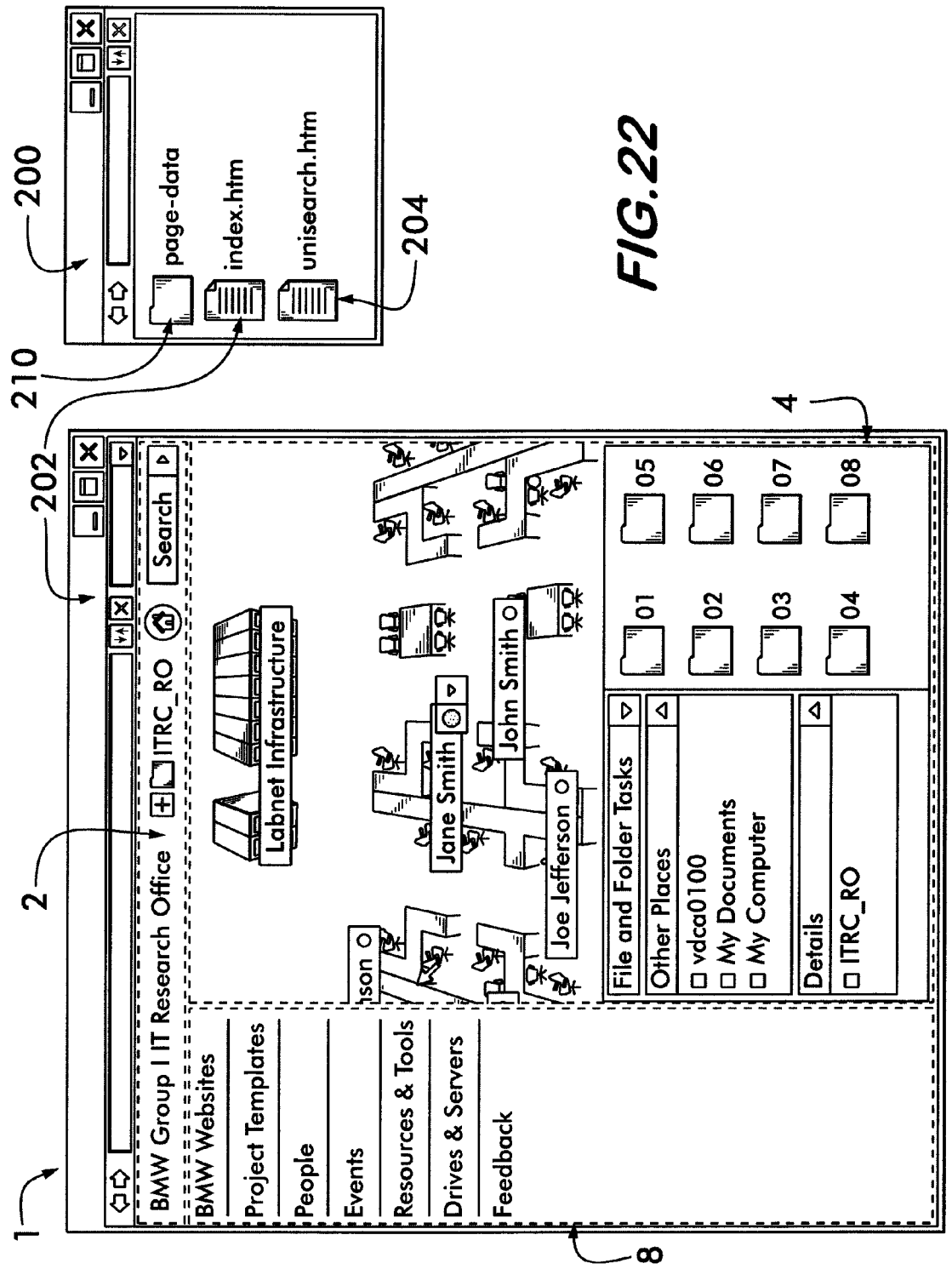
Figure 23:
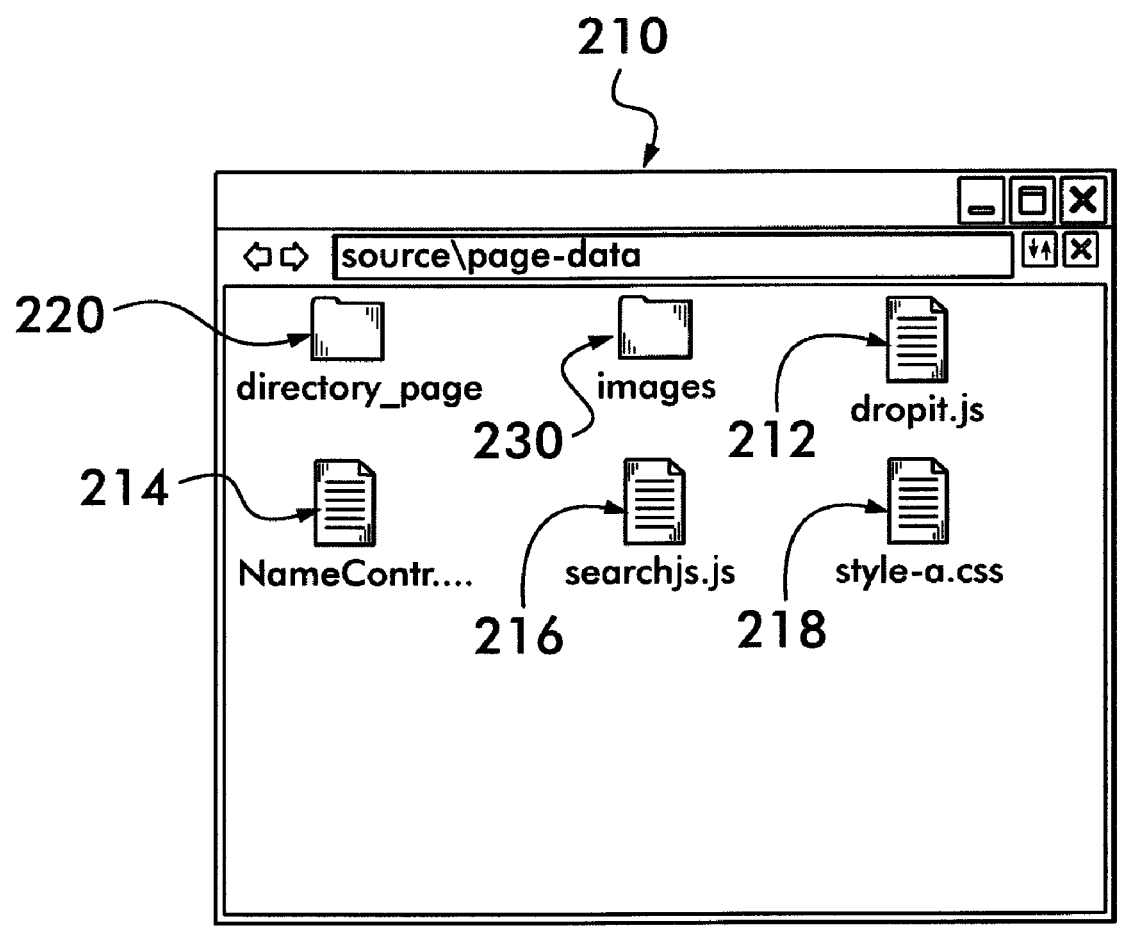

FIG. 22 shows a source folder 200, which includes all of the files that run the virtual office management system 1. The index.htm file 202 runs what content is displayed within a display window of a common web browser, including the top element 2, inline frame 4, and side element 8. The image output module 90 runs this index.htm file 202, which provides overall structure of the single view web page. Overall, the index.htm file 202 provides structure of the top element 2, side element 8, and inline frame 4, as well embedded hyperlinks within the web page, including the resource links 130, file directory shortcut link 140, sharepoint link 150, and search feature link 160, as well as the reset tool 130 that resets the virtual office manager 1 back to page defaults.

The unisearch.htm file 204 provides frame structure and search ability of the search feature module 60. When activated, through the search feature link 160, the unisearch.htm file 204 runs through the inline frame 4. The unisearch.htm file 204 is a collection of tables, buttons and drop down menus, that provide the end user selection of search criteria such as worldwide web search tools (Google web, Google images, Wiki, LEO translate, currency calculator) and/or internal company search capabilities (Brainframe Wiki, BMW Group Search, Group Directory, W.10 Extension, MUC Extension). Also included within the code of the unisearch.htm file 204 is connection to a JavaScript file, searchjs.js 212 which is found in the page_data folder 210, and displayed in FIG. 23.

The page_data folder 210 includes the files and executables that run the virtual office management system, specifically the index.htm file 202 and unisearch.htm file 204. A directory_page folder 220 is a file folder that includes html files that run through the physical office 10 and the desktop module 20. The images folder 230 includes any of the images that are layered into the single view web page of the virtual office management system 1.

A dropit.js 212 java script file is provided within the page_data folder 210. The dropit.js 212 java script file controls the drop down menus in the unisearch.htm file 204, as well as any drop down menus used with the resource links 130. Whenever a selection is made and form is run, the javascript file takes into account which selections have been made and runs a query string with a URL and inputs based on those selections. The form page is then replaced with the results of the query. The form page populating the inline frame 4.

A web tutorial on alistapart.com provides the basis for this menu system.

A namecontrol.js 216 is another java script file provided in the page_data 210 folder, and is used to operate the presence utility. As discussed above, the java script is provided by Microsoft.

A search.js 216 java script file controls the unisearch.htm file 204 that runs the search module 60. The search.js 216 java script file functions by deciding what search criteria has been selected, and then retrieving search results based on that criteria.

Additionally, a style_a.css file is provided in the page_data 210 folder. This file simply defines the aesthetic features of the virtual office management system, including font size and color, background color, and borders.

Figure 24:
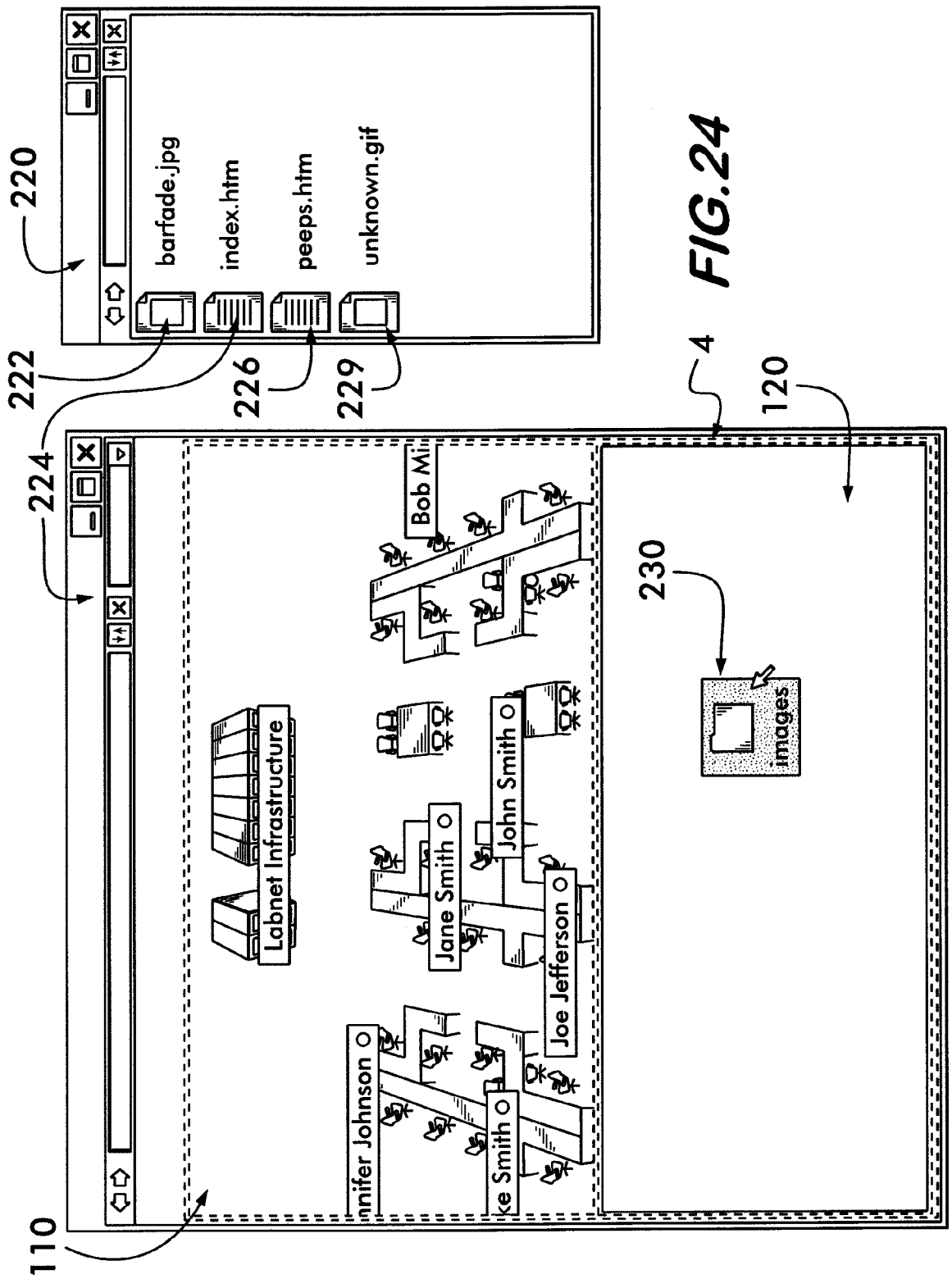

The content of the directory_page folder 220 is provided within FIG. 24. An inline index.htm file 224 provides inline frame 4 structure, allowing the inline frame to be split between the top and bottom inline frames 110, 120. As a result, the inline index.htm file 224 is automatically activated by default, and included as part of the "start page". The inline index.htm file 224 permits the inline frame 4 to be divisible between a top inline frame 110 and a bottom inline frame 120, where the physical office module 10 is run through the top inline frame 110 and the desktop module 20 runs through the bottom inline frame 120. A peeps.htm file 226 is the imported three-dimensional image that is layered with various <div> tags and staff employee directory links. Additionally, jpeg images, such as physicals assets and presence awareness bubbles, are layered over the peeps.htm file 226, as well. As a result, the peeps.htm file 226 provides links to staff employee directories (click on name) or lab infrastructure data (links to pdfs—that automatically open with the entire inline frame).

The peeps.htm file 226 allows the desktop module 20 to control content within the bottom inline frame 120. Initially, the bottom inline frame 120 would display a pre-determined file folder. However, when the end user select a link embedded within top inline frame 110, the bottom inline frame 120 is displayed with content from a folder that the link connects. As a result, the end user may use the virtual office management system 1 to manage staff members within a single view web page, having a three-dimensional office environment linking to file directories, a presence awareness utility, and variety of user resources immediately accessible.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A virtual office management system, comprising:
an image output device that displays as a single view web page;
a series of defined window sections viewable in the single view web page, one defined window section being a divisible frame capable of displaying separate content within that divisible frame;
a physical office module connected to the single view web page and displaying a layered physical office environment within the divisible frame, the layered physical office environment having tags assigned to physical assets and file directories of individual staff members, the tags providing access and displayable information regarding the physical asset or the individual staff members;
a desktop module connected to the single view web page and displaying desktop module content of individual staff members through the divisible frame, the desktop module content includes a pre-determined file directory displayed as a system file folder and changeable through the tags of the layered physical office environment; and
a resource module connected to and displaying resource content through the single view web page through a series of separate embedded links, the links individually layered into another frame of the single view web page and connected to both internal and external content.

2. The virtual office management system of claim 1, wherein the defined window sections include a top element, side element and a divisible inline frame.

3. The virtual office management system of claim 1, wherein the inline frame is divisible between a top inline frame and a bottom inline frame.

4. The virtual office management system of claim 3, wherein the layered physical office environment is displayable through the top inline frame.

5. The virtual office management system of claim 3, wherein the desktop module content is displayable through the bottom inline frame.

6. The virtual office management system of claim 3, wherein the layered physical office environment is displayable through the bottom inline frame.

7. The virtual office management system of claim 3, wherein the desktop module content is displayable through the top inline frame.

8. The virtual office management system of claim 1, further comprising a reset feature that sets the single view web page back to a default start page.

9. The virtual office management system of claim 2, further comprising a corporate portal module connected through an embedded link within the top element, the corporate portal module providing access to a document-management platform that runs through the divisible inline frame.

10. The virtual office management system of claim 2, further comprising a file directory module connected through another embedded link within the top element, the file directory module providing access to the shared server files and displayable within the divisible inline frame.

11. The virtual office management system of claim 4, wherein the layered physical office environment is a three-dimensional graphical user interface.

12. The virtual office management system of claim 11, wherein the three-dimensional graphical user interface is prepared as a two-dimensional image with perspective, using Google SketchUp.

13. The virtual office management system of claim 12, wherein the layered physical office environment is includes physical assets.

14. The virtual office management system of claim 1, wherein the physical office module includes communication abilities through the layered physical office environment.

15. The virtual office management system of claim 1, wherein the physical office module displays employee presence awareness through the layered physical office environment.

16. A method of managing staff members, comprising the steps of:
    navigating through a single view web page, having several defined sections, including at least one divisible frame capable of displaying separate content within that divisible frame;
    providing a layered physical office environment with tags assigned to physical assets and file directories of individual staff members, the tags providing access and displayable information regarding the physical asset or the individual staff members;
    selecting information linked to a physical asset or the file directories of individual staff members linked through a three-dimensional office environment displayable in one section of the divisible frame, and the information or selected staff member file directory displayed in another section of the divisible frame;
    selecting specific content within the selected file directory, the specific content displayable within an entirety of the divisible frame; and
    selecting user resources through a series of links embedded within the defined sections, other than the divisible frame, the user resources displayable within an entirety of the divisible frame.

17. The method of managing staff members according to claim 16, further comprising the steps of:
    requesting displayable content through a top element, a side element and a divisible inline frame of the single view web page having defined sections.

18. The method of managing staff members according to claim 17, further comprising the steps of:
    selecting specific staff member file directory content through a three-dimensional office environment displayable within a top inline frame of the divisible frame, the staff member file directory content displayable in a bottom inline frame of the divisible frame.

19. The method of managing staff members according to claim 17, further comprising the steps of:
    navigating and selecting specific staff member file content displayable through a bottom inline frame of the divisible frame.

20. The method of managing staff members according to claim 17, further comprising the steps of:
    displaying specific staff member file content through the divisible frame.

21. The method of managing staff members according to claim 16, further comprising the steps of:
    selecting a reset feature that sets the single view web page back to a default start page.

22. The method of managing staff members according to claim 17, further comprising the steps of:
    selecting a corporate portal module connected through an embedded link within the top element, the corporate portal module providing access to a document-management platform that is displayable through the divisible inline frame.

23. The method of managing staff members according to claim 17, further comprising the steps of:
    selecting a file directory module connected through another embedded link within the top element, the file directory module providing access to the shared server files and displayable through the divisible inline frame.

24. The method of managing staff members according to claim 17, further comprising the steps of:
    communicating with staff members through the single view webpage.

25. The method of managing staff members according to claim 24, wherein the step of communicating with staff members is performed through the displayable three-dimensional office environment.

26. The method of managing staff members according to claim 17, further comprising the steps of:
    monitoring staff member through employee presence awareness.

27. The method of managing staff members according to claim 24, wherein the step of monitoring staff members is performed through the displayable three-dimensional office environment.

* * * * *